(12) United States Patent
Park et al.

(10) Patent No.: US 12,557,172 B2
(45) Date of Patent: Feb. 17, 2026

(54) METHOD AND APPARATUS FOR CONTROLLING INTERFERENCE DUE TO SL DRX OPERATION-RELATED SWITCHING OF RF MODULE IN NR V2X

(71) Applicant: LG ELECTRONICS INC., Seoul (KR)

(72) Inventors: Giwon Park, Seoul (KR); Seungmin Lee, Seoul (KR); Seoyoung Back, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 493 days.

(21) Appl. No.: 18/247,786

(22) PCT Filed: Oct. 6, 2021

(86) PCT No.: PCT/KR2021/013695
§ 371 (c)(1),
(2) Date: Apr. 4, 2023

(87) PCT Pub. No.: WO2022/075742
PCT Pub. Date: Apr. 14, 2022

(65) Prior Publication Data
US 2023/0371119 A1    Nov. 16, 2023

(30) Foreign Application Priority Data

Oct. 6, 2020    (KR) .................... 10-2020-0128948
Oct. 8, 2020    (KR) .................... 10-2020-0129877
(Continued)

(51) Int. Cl.
*H04W 76/28*    (2018.01)
*H04L 1/1867*    (2023.01)
(Continued)

(52) U.S. Cl.
CPC .......... *H04W 76/28* (2018.02); *H04L 1/1887* (2013.01); *H04L 47/32* (2013.01); *H04W 72/25* (2023.01);
(Continued)

(58) Field of Classification Search
CPC ....... H04L 1/188; H04L 1/1887; H04L 47/32; H04W 4/40; H04W 28/0278;
(Continued)

(56) References Cited

U.S. PATENT DOCUMENTS

2018/0206252 A1    7/2018    Thangarasa et al.
2019/0045345 A1    2/2019    Lee et al.
(Continued)

OTHER PUBLICATIONS

European Patent Office Application Serial No. 21877993.2, Search Report dated Sep. 20, 2024, 9 pages.
(Continued)

*Primary Examiner* — Thomas R Cairns
(74) *Attorney, Agent, or Firm* — LEE, HONG, DEGERMAN, KANG & WAIMEY

(57) ABSTRACT

A method for operating a first device (100) in a wireless communication system is proposed. The method may comprise the steps of: generating uplink (UL) data; on the basis of sidelink (SL) discontinuous reception (DRX) configuration-related on/off switching of a SL radio frequency (RF) module, which is performed at a first time point, determining that transmission of the UL data does not occur at the first time point; and on the basis of the determination that transmission of the UL data does not occur at the first time point and a priority value, which is related to the UL data and is smaller than a threshold value, changing a time point, at which the on/off switching of the SL RF module is performed, from the first time point to a second time point.

15 Claims, 21 Drawing Sheets

(30) Foreign Application Priority Data

Oct. 12, 2020 (KR) ........................ 10-2020-0130850
Oct. 14, 2020 (KR) ........................ 10-2020-0132524

(51) Int. Cl.
| | | |
|---|---|---|
| *H04L 47/32* | (2022.01) | |
| *H04W 72/25* | (2023.01) | |
| *H04W 72/563* | (2023.01) | |
| *H04W 28/02* | (2009.01) | |
| *H04W 72/21* | (2023.01) | |
| *H04W 92/18* | (2009.01) | |

(52) U.S. Cl.
CPC ...... *H04W 72/563* (2023.01); *H04W 28/0278* (2013.01); *H04W 72/21* (2023.01); *H04W 92/18* (2013.01)

(58) Field of Classification Search
CPC ..... H04W 40/22; H04W 72/02; H04W 72/04; H04W 72/0446; H04W 72/12; H04W 72/20; H04W 72/21; H04W 72/25; H04W 72/40; H04W 72/541; H04W 72/563; H04W 72/569; H04W 76/14; H04W 76/28; H04W 92/10; H04W 92/18
See application file for complete search history.

(56) References Cited

U.S. PATENT DOCUMENTS

2019/0320491 A1    10/2019  Shukair et al.
2021/0037549 A1*    2/2021  Akkarakaran .......... H04W 4/00
2021/0400762 A1*   12/2021  Jeong .................... H04W 76/28

OTHER PUBLICATIONS

Mediatek Inc., "Discussion on NR V2X interruption requirement," R4-1910902, 3GPP TSG-RAN WG4 Meeting #92bis, Oct. 2019, 4 pages.

* cited by examiner (a)  (b)  (c)

● : TX UE
◉ : RX UE (a)

(b)

(a)

(b)

FIG. 15 receiving, from a first device,
UL data at a first time point — S1510

METHOD AND APPARATUS FOR CONTROLLING INTERFERENCE DUE TO SL DRX OPERATION-RELATED SWITCHING OF RF MODULE IN NR V2X

CROSS-REFERENCE TO RELATED APPLICATION(S)

This application is the National Stage filing under 35 U.S.C. 371 of International Application No. PCT/KR2021/013695, filed on Oct. 6, 2021, which claims the benefit of earlier filing date and right of priority to Korean Application Nos. 10-2020-0128948, filed on Oct. 6, 2020, 10-2020-0129877, filed on Oct. 8, 2020, 10-2020-0130850, filed on Oct. 12, 2020, and 10-2020-0132524, filed on Oct. 14, 2020, the contents of which are all hereby incorporated by reference herein in their entireties.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

In an embodiment, a method of operating a first device 100 in a wireless communication system is proposed. The method may comprise: generating uplink (UL) data; determining that the UL data cannot be transmitted at a first time point, based on on/off switching of a sidelink (SL) radio frequency (RF) module, related to an SL discontinuous reception (DRX) configuration, performed at the first time point; and changing a time point at which on/off switching of the SL RF module is performed from the first time point to a second time point, based on the determination that the UL data cannot be transmitted at the first time point and a priority value related to the UL data less than a threshold.

The user equipment (UE) can efficiently perform SL communication.

BRIEF DESCRIPTION OF THE DRAWINGS

FIG. 15 shows a procedure for a base station to perform wireless communication according to an embodiment of the present disclosure.

DETAILED DESCRIPTION

Figure 1:
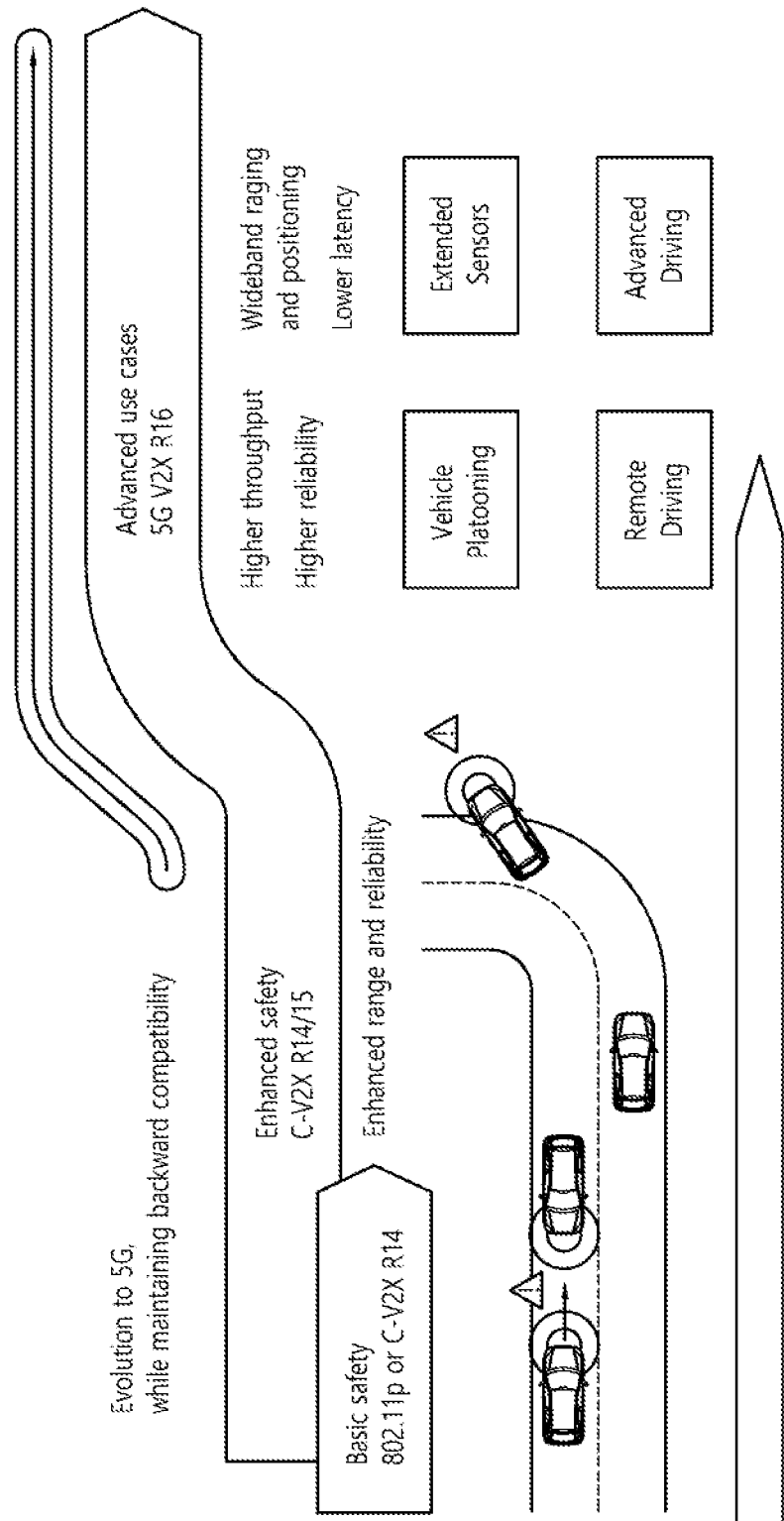
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
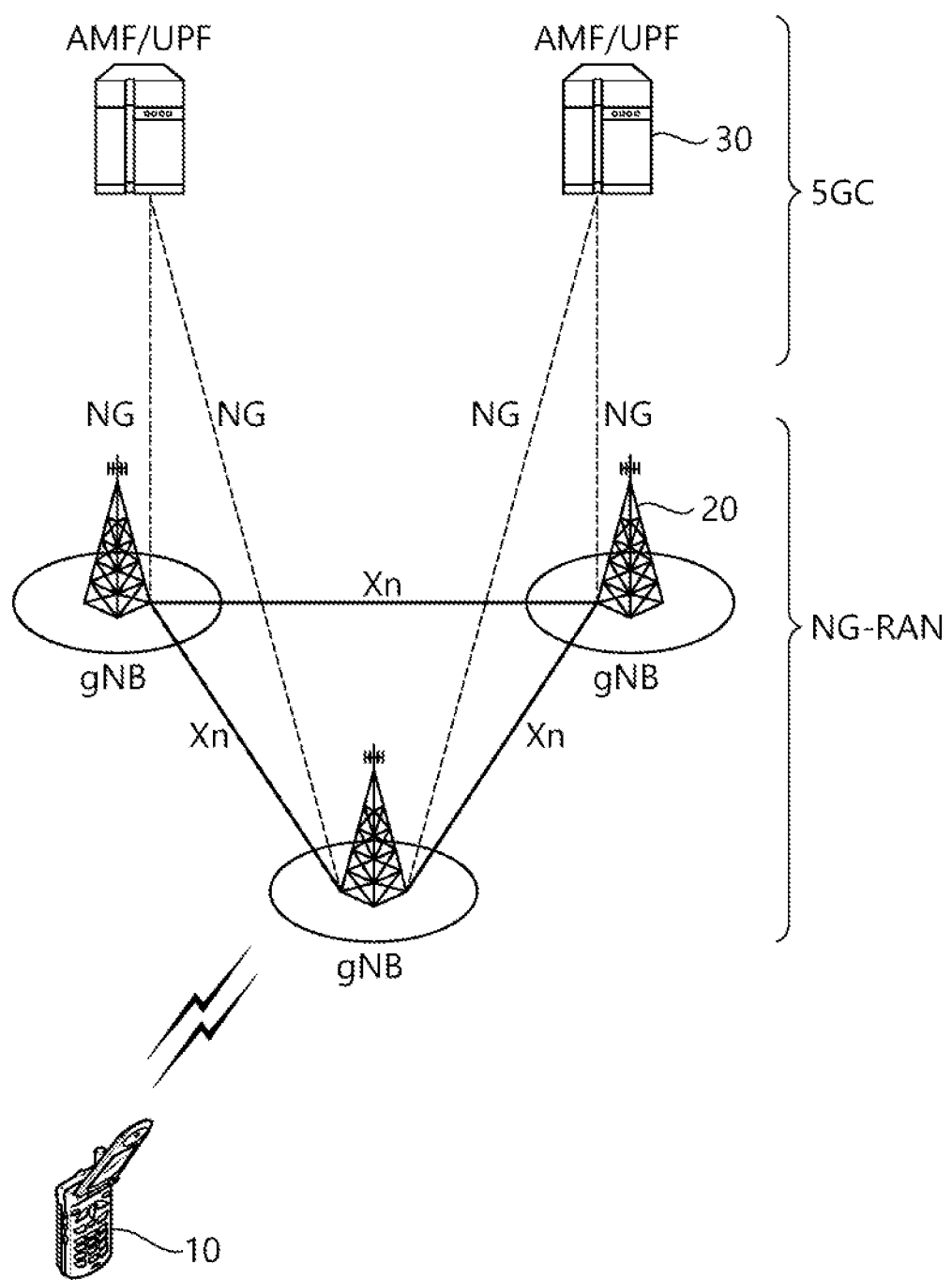
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
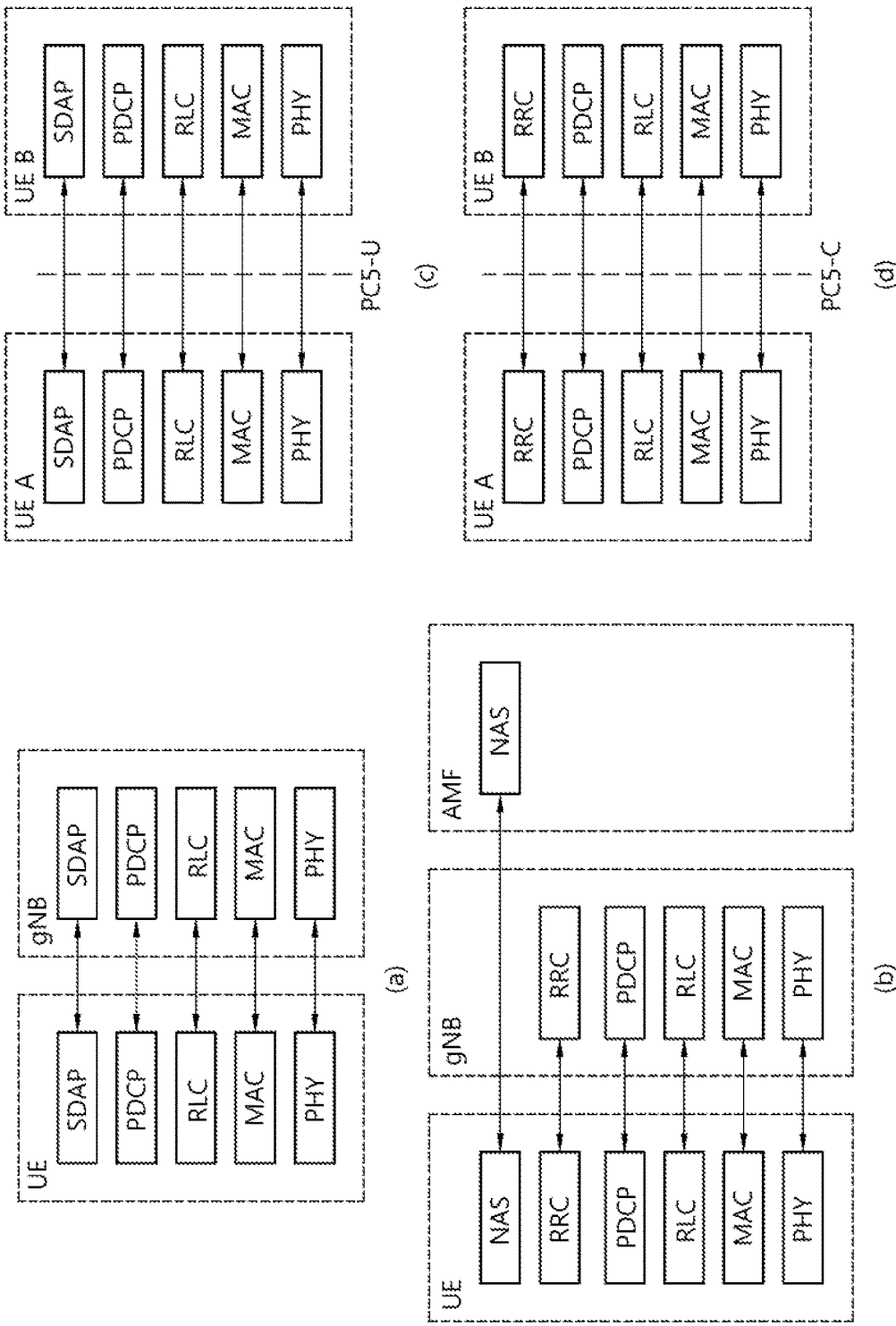
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
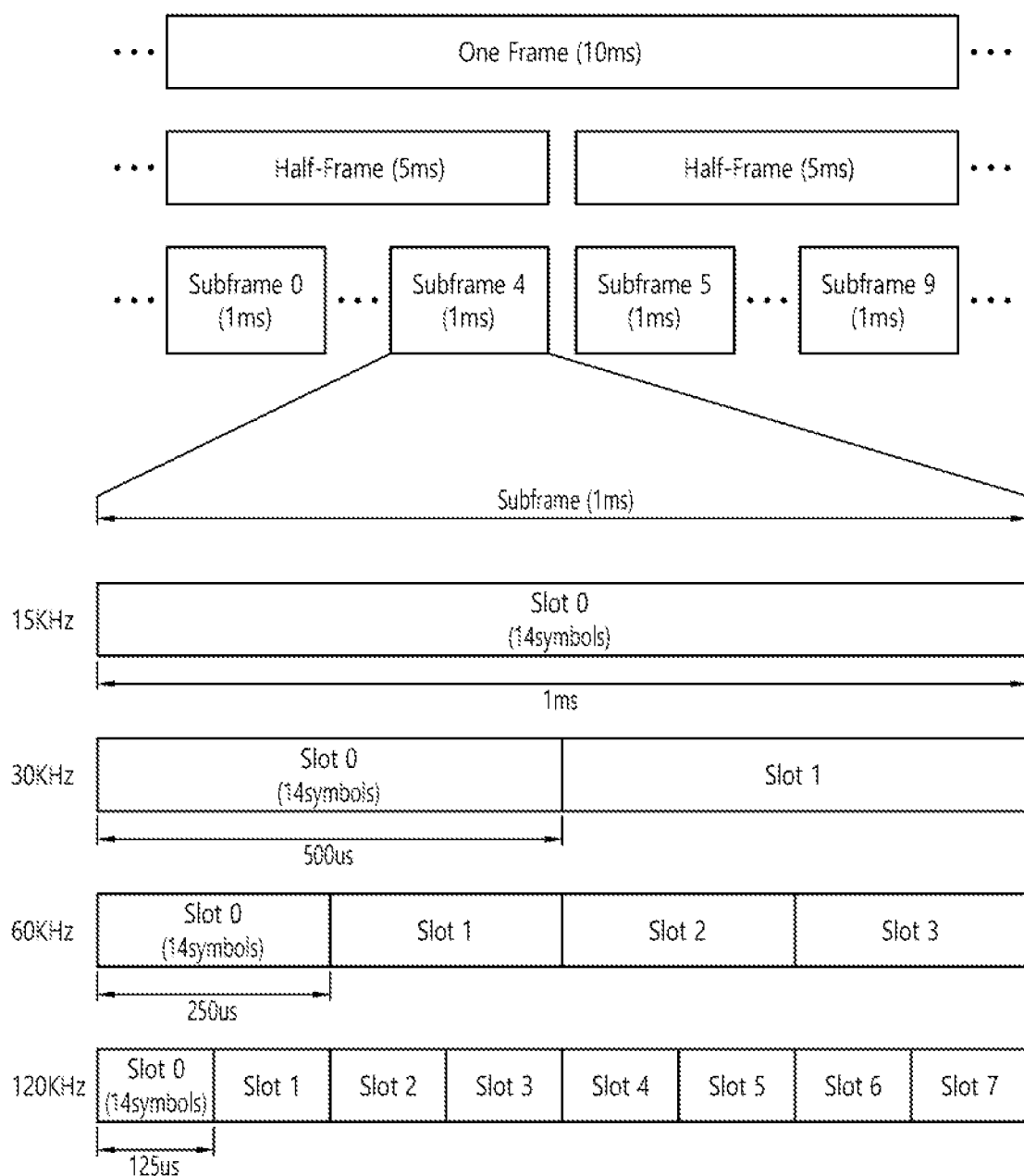
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
| --- | --- | --- | --- |
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or interval) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 5:
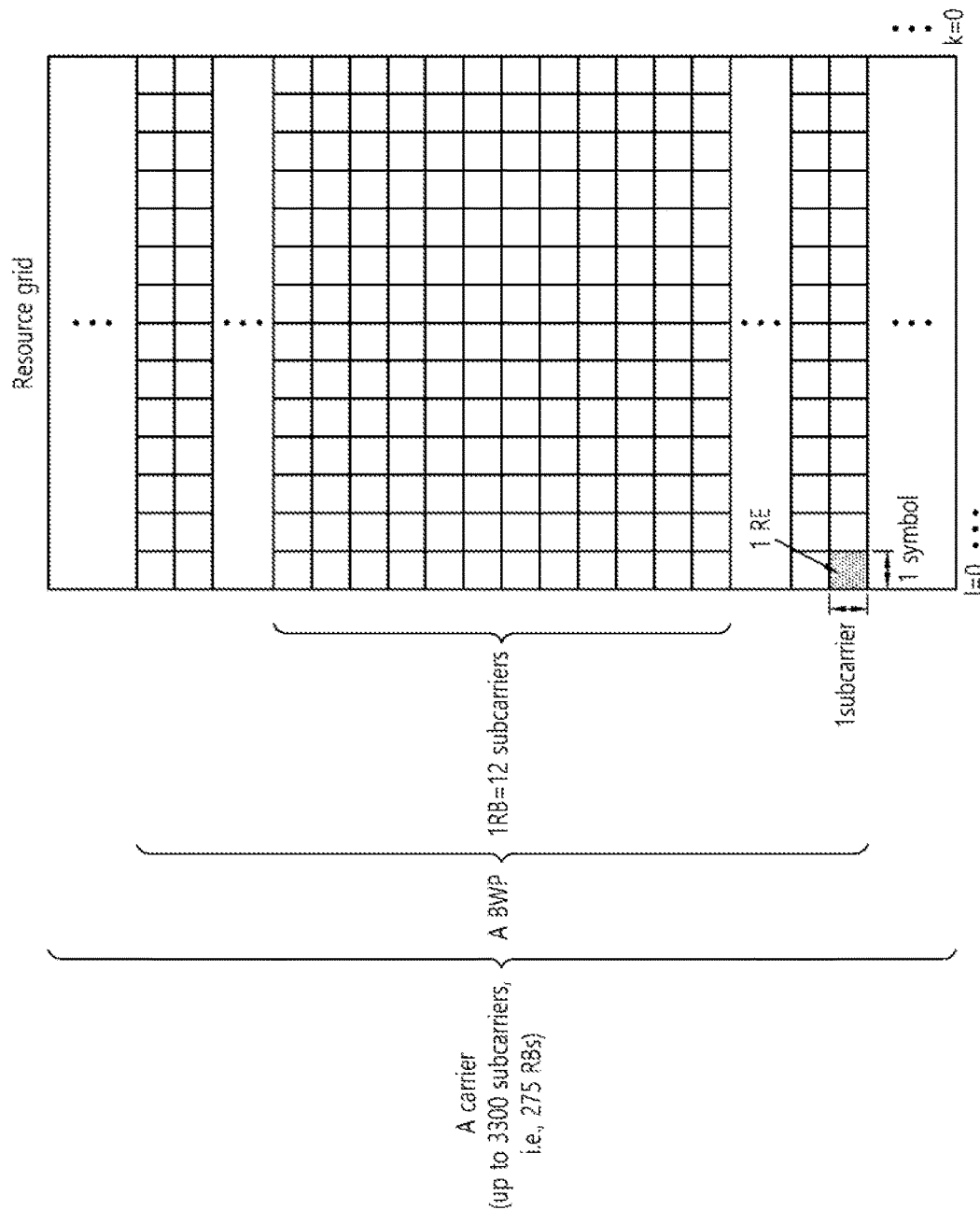
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
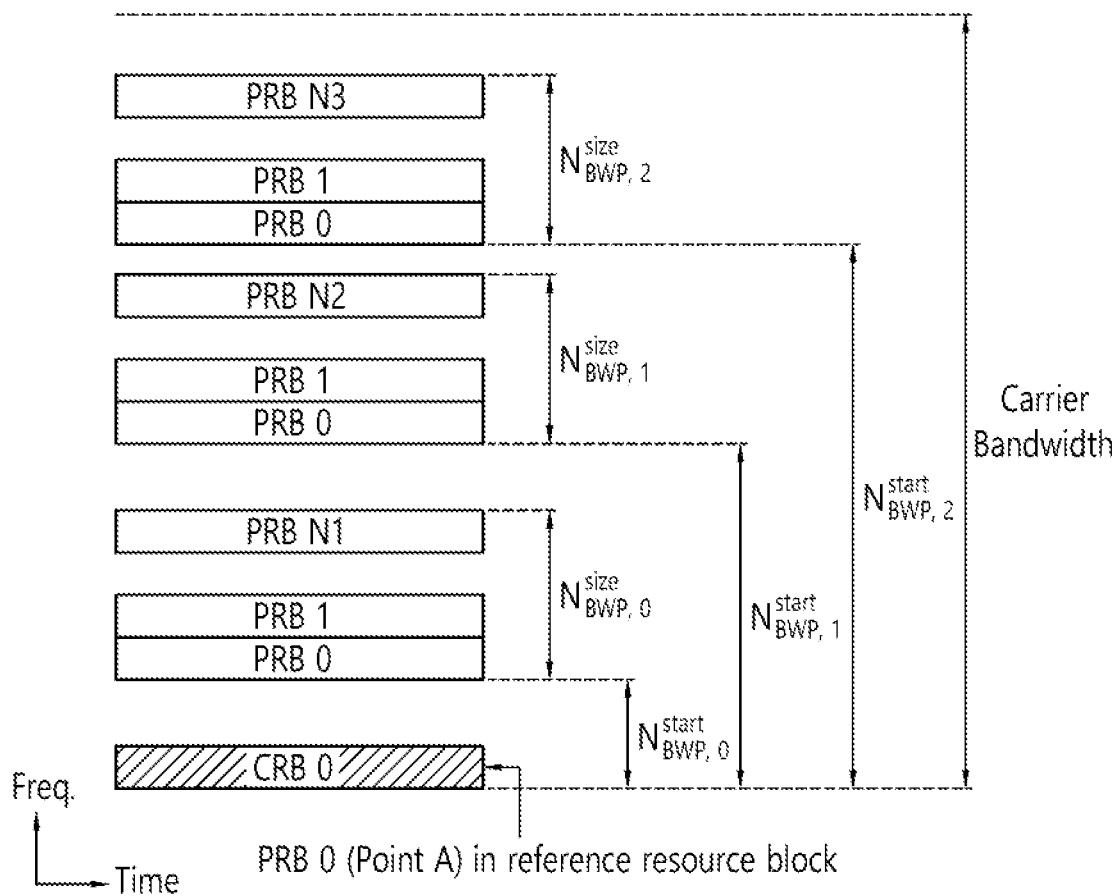
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
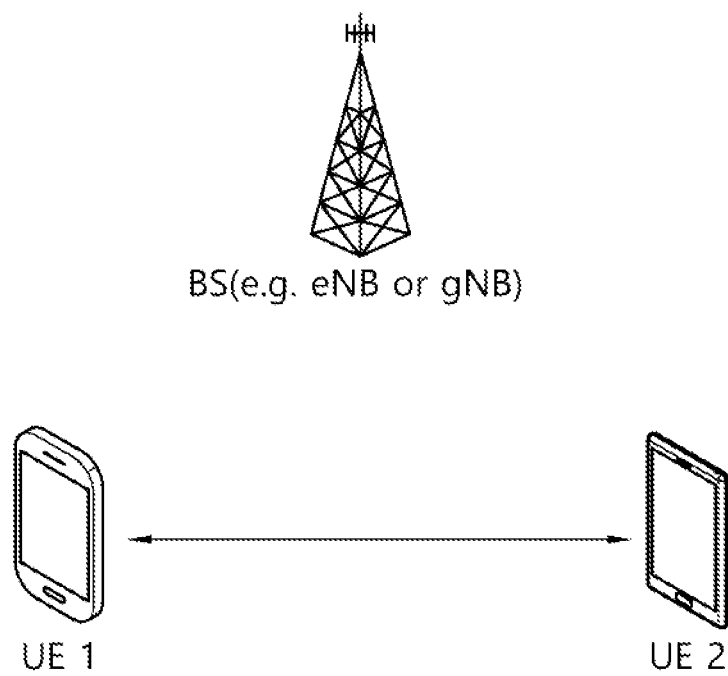
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
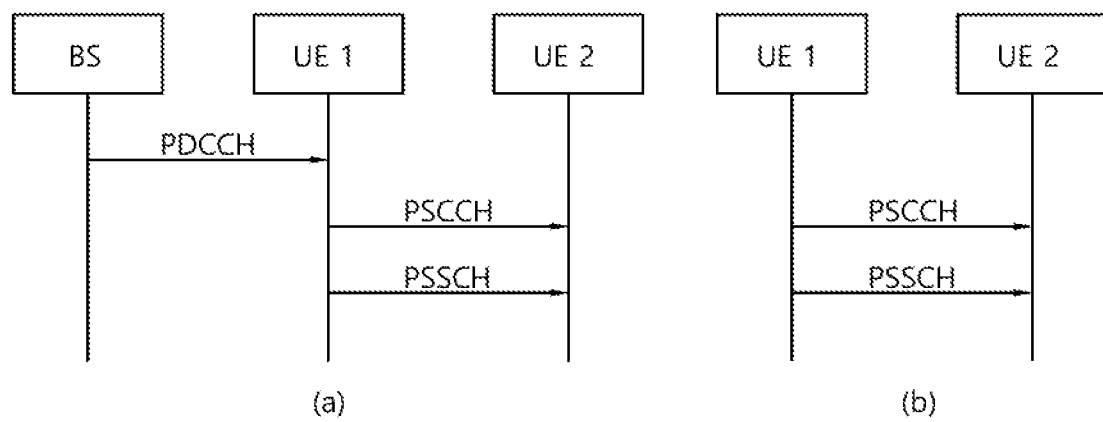
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
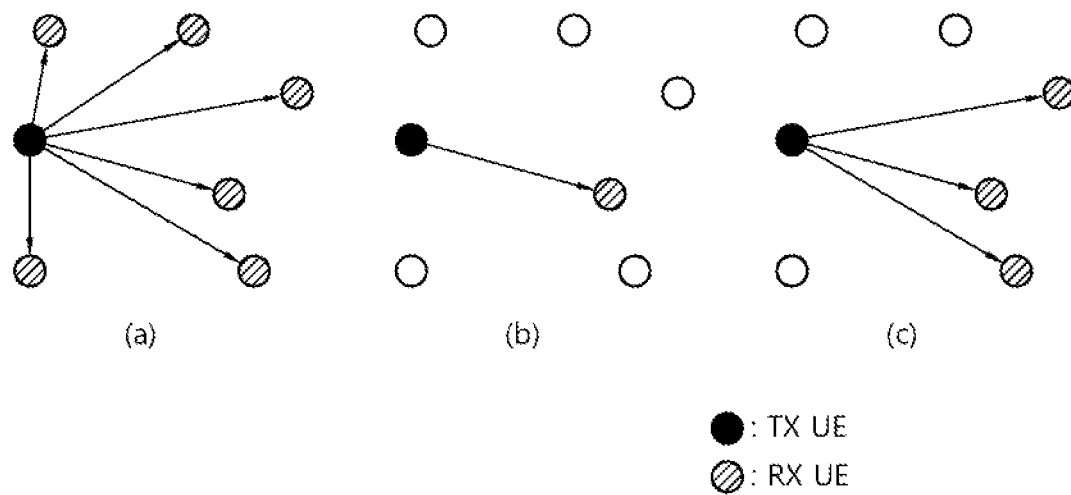
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, power saving will be described.

As a power saving technique of at UE, UE adaptation to traffic and power consumption characteristics, adaptation according to frequency/time change, adaptation to antenna, adaptation to discontinuous reception (DRX) configuration, adaptation to UE processing capability, adaptation for reduction of PDCCH monitoring/decoding, power saving signal/channel/procedure for triggering adaptation to UE power consumption, power consumption reduction in RRM measurement, etc. may be considered.

Hereinafter, discontinuous reception (DRX), which is one of techniques capable of realizing UE power saving, will be described.

The procedure of a DRX-related UE can be summarized as shown in Table 5 below.

TABLE 5

| | Type of signals | UE procedure |
| --- | --- | --- |
| Step 1 | RRC signaling (MAC-CellGroupConfig) | receive DRX configuration information |
| Step 2 | MAC CE((Long) DRX command MAC CE) | receive DRX command |
| Step 3 | | monitor PDCCH during on-duration of DRX period |

Figure 10:
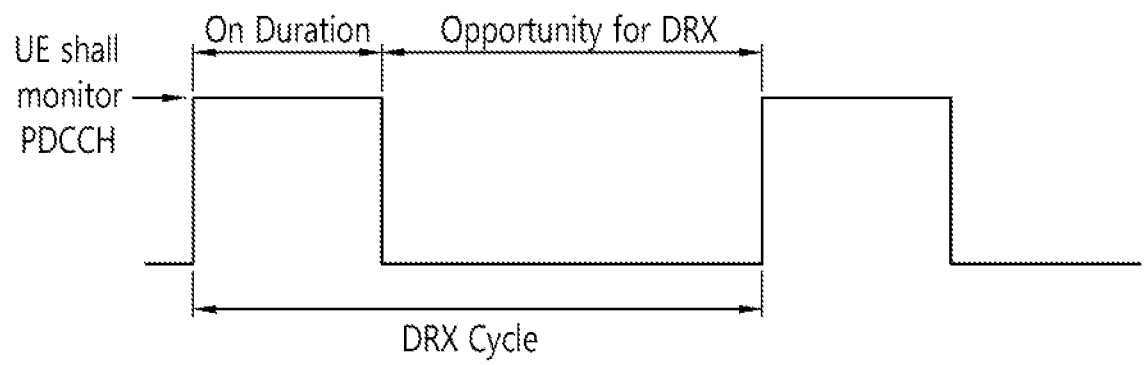
FIG. 10 shows an example of a DRX cycle according to an embodiment of the present disclosure.

FIG. 10 shows an example of a DRX cycle according to an embodiment of the present disclosure. The embodiment of FIG. 10 may be combined with various embodiments of the present disclosure.

Referring to FIG. 10, a UE uses DRX in RRC_IDLE state and RRC_INACTIVE state to reduce power consumption. When DRX is configured, a UE performs DRX operation according to DRX configuration information. A UE operating as DRX repeatedly turns on and off the reception task.

For example, when DRX is configured, a UE attempts to receive a downlink channel PDCCH only within a pre-configured time interval, and does not attempt to receive the PDCCH within the remaining time interval. The time period during which a UE should attempt to receive a PDCCH is called on-duration, and the on-duration period is defined once per DRX cycle.

A UE may receive DRX configuration information from a gNB through RRC signaling, and may operate as DRX through reception of a (long) DRX command MAC CE.

DRX configuration information may be included in MAC-CellGroupConfig. The IE, MAC-CellGroupConfig, may be used to configure MAC parameters for a cell group, including DRX.

A DRX command MAC CE or long DRX command MAC CE is identified by a MAC PDU subheader with a logical channel ID (LCID). It has a fixed size of 0 bits.

Table 6 below shows a value of LCID for DL-SCH.

TABLE 6

| Index | LCID values |
| --- | --- |
| 111011 | Long DRX Command |
| 111100 | DRX Command |

The PDCCH monitoring operation of a UE is controlled by DRX and Bandwidth Adaptation (BA). On the other hand, when DRX is configured, a UE does not need to continuously monitor a PDCCH. On the other hand, DRX has the following characteristics.

on-duration: This is a period in which a UE waits to receive the next PDCCH after waking up. If a UE successfully decodes a PDCCH, the UE maintains the awake state and starts an inactivity-timer.

an inactive timer: This is a time interval in which a UE waits for successful PDCCH decoding from the last successful PDCCH decoding, and it is a period in which the UE sleeps again in case of failure. A UE must restart an inactivity timer after a single successful decoding of a PDCCH for the only first transmission (i.e., not for retransmission).

a retransmission timer: A time interval during which a retransmission is expected.

a cycle: It defines the periodic repetition of on-duration and subsequent possible periods of inactivity.

Hereinafter, DRX in a MAC layer will be described. Hereinafter, a MAC entity may be expressed as a UE or a MAC entity of a UE.

A MAC entity may be configured by RRC with DRX function for controlling a PDCCH monitoring activity of a UE for a radio network temporary identifier (C-RNTI), CS-RNTI, TPC-PUCCH-RNTI, TPC-PUSCH-RNTI, and TPC-SRS-RNTI of the MAC entity. When using DRX operation, a MAC entity must monitor a PDCCH. In the RRC_CONNECTED state, if DRX is configured, a MAC entity may monitor a PDCCH discontinuously using a DRX operation. Otherwise, a MAC entity must continuously monitor a PDCCH.

RRC controls DRX operation by configuring parameters of DRX configuration information.

If a DRX cycle is configured, an active time includes the following time.

a running time of drx-onDurationTimer or drx-InactivityTimer or drx-RetransmissionTimerDL or drx-RetransmissionTimerUL or ra-ContentionResolutionTimer; or a time a scheduling request was transmitted on a PUCCH and is pending; or a time when a PDCCH indicating new transmission to a C-RNTI of a MAC entity is not received after successful reception of a random access response to a random access preamble not selected by the MAC entity among contention-based random access preambles.

When DRX is configured, a UE must follow a procedure below.

1> if a MAC PDU is transmitted in a configured uplink grant

2> start the drx-HARQ-RTT-TimerUL for the corresponding HARQ process after the first reception of the corresponding PUSCH transmission;

2> stop the drx-RetransmissionTimerUL for the corresponding HARQ process.
1> if a drx-HARQ-RTT-TimerDL expires:
2> if the data of the corresponding HARQ process was not successfully decoded:
3> start the drx-RetransmissionTimerDL for the corresponding HARQ process.
1> if a drx-HARQ-RTT-TimerUL expires:
2> start the drx-RetransmissionTimerUL for the corresponding HARQ process.
1> if a DRX Command MAC CE or a Long DRX Command MAC CE is received:
2> stop drx-onDurationTimer;
2> stop drx-InactivityTimer.
1> if drx-InactivityTimer expires or a DRX Command MAC CE is received:
2> if the Short DRX cycle is configured:
3> start of restart drx-ShortCycleTimer;
3> use the Short DRX Cycle.
2> else:
3> use the Long DRX cycle.
1> if drx-ShortCycleTimer expires:
2> use the Long DRX cycle.
1> if a Long DRX Command MAC CE is received:
2> stop drx-ShortCycleTimer;
2> use the Long DRX cycle.
1> if the Short DRX Cycle is used, and [(SFN×10)+subframe number] modulo (drx-ShortCycle)=(drx-StartOffset) modulo (drx-ShortCycle); or
1> if the Long DRX Cycle is used, and [(SFN×10)+subframe number] modulo (drx-LongCycle)=drx-StartOffset:
2> if drx-SlotOffset is configured:
3> start drx-onDurationTimer after drx-SlotOffset.
2> else:
3> start drx-onDurationTimer.
1> if the MAC entity is in Active Time:
2> monitor the PDCCH;
2> if the PDCCH indicates a DL transmission or if a DL allocation is configured:
3> start the drx-HARQ-RTT-TimerDL for the corresponding HARQ process after the end of the corresponding PUCCH transmission;
3> stop the drx-RetransmissionTimerDL for the corresponding HARQ process.
2> if the PDCCH indicates a UL transmission:
3> start the drx-HARQ-RTT-TimerUL for the corresponding HARQ process after the end of the first reception of the corresponding PUSCH transmission;
3> stop drx-RetransmissionTimerUL for the corresponding HARQ process.
2> if the PDCCH indicates a new transmission (DL or UL):
3> start or restart drx-InactivityTimer.
1> else (That is, when it is not a part of the active time):
2> not transmit type-0-triggered SRS.
1> if CSI masking (csi-Mask) is setup by upper layers:
2> if drx-onDurationTimer is not running:
3> not report CSI on PUCCH.
1> else:
2> if the MAC entity is not in the active time:
3> not report CSI on PUCCH.
Regardless of whether the MAC entity monitors the PDCCH or not, the MAC entity sends HARQ feedback and type-1-triggered SRS when expected.

If it is not a complete PDCCH time point (i.e., if the active time starts or expires in the middle of the PDCCH time point), the MAC entity does not need to monitor a PDCCH.

For example, in the present disclosure, a priority value related to data may be determined as the smallest value among priority values of LCHs related to generation of a MAC PDU including the data. For example, in the present disclosure, a relatively low priority may mean that a priority value is relatively large. For example, in the present disclosure, a high priority may mean that a priority value is relatively small.

For example, UL/SL prioritization in the present disclosure may include comparing a priority value related to UL data with a UL threshold value; and comparing a priority value related to SL data with an SL threshold value when the priority value related to the UL data is greater than the UL threshold value. For example, when the priority value related to the UL data is smaller than the UL threshold value, the priority value related to the SL data may be dropped without being compared with the SL threshold value.

In this specification, the wording "configuration or definition" may be interpreted as being (pre)configured (via predefined signaling (e.g., SIB, MAC signaling, RRC signaling)) from a base station or network. For example, "A may be configured" may include "(pre)configuring/defining or notifying A of a base station or network for a UE". Alternatively, the wording "configure or define" may be interpreted as being previously configured or defined by the system. For example, "A may be configured" may include "A is configured/defined in advance by the system".

Meanwhile, in NR V2X of Release 16, a power saving operation of a UE was not supported, and from NR V2X of Release 17, the power saving operation (e.g., sidelink (SL) discontinuous reception (DRX) operation) of the UE (e.g., a pedestrian UE) is scheduled to be supported. For example, an SL DRX operation may refer to an operation of transmitting/receiving SL data in an active mode and performing power saving by turning off an RF module in a sleep mode.

Also, for example, when a UE performs a Uu DRX operation and an SL DRX operation, when a Uu RF chain and an SL RF chain operate independently, interruption between links (Uu link and SL link) may occur. For example, when a UE turns on/off the RF module for an SL DRX operation, communication of Uu link may be interfered with. For example, when an RF module is turned on or off in relation to an SL DRX operation, interruption may occur, resulting in loss in UL (uplink) TX (and/or DL (downlink) RX) operation. In addition, when RF is turned on/off for Uu DRX operation, interruption may occur in communication of an SL link.

Therefore, in the present disclosure, a method for compensating for loss of UL TX (and/or DL RX) operation due to interruption, when an RF module is turned on or off in relation to an SL DRX operation is proposed. In the following description, 'when, if, in case of' may be replaced with 'based on'.

According to an embodiment of the present disclosure, (proposal 1) when interruption occurs in a UL TX operation due to On/Off of an SL DRX related RF module, or when a UE turns on or off the RF module in relation to an SL DRX operation, if interruption occurs and loss occurs in UL TX (and/or DL RX) operation, depending on the UL channel/packet priority, etc., the UE may be configured not to cause interruption. For example, in cases of PRACH transmission, (UU or SL) PUCCH transmission including HARQ-ACK information, emergency service related UL packet transmission, URLLC UL packet transmission, UL packet transmission in which a UL priority value mapped to a logical channel (LCH) is lower than a pre-configured UL threshold value, UL configured grant resource (where a UL priority value mapped to a logical channel is lower than a pre-configured UL threshold value), UL packet transmission with a higher priority than the priority of an SL packet (that is, when the priority mapped to the LCH of the UL packet is higher than the SL priority mapped to the LCH of the SL packet), transmission of UL packets to which a logical channel with a higher priority than a pre-configured threshold is mapped, UL configured grant resources (to which a logical channel with a higher priority than a pre-configured threshold is mapped), etc., it is possible to have a UE adjust the On/Off timing of its own RF module so that interruption does not occur. That is, this method may be a method of protecting a relatively important UL TX while reducing a power saving effect. For example, when the priority value is smaller than the threshold value, the priority of the corresponding packet may be high.

That is, for example, while a UE is performing an SL DRX operation, at the time when an SL DRX on-duration period expires or at the time of entering a sleep mode (operation of turning off an SL RF) for power saving due to the expiration of an SL active time period, when a UL packet with a high transmission priority (the aforementioned UL packet with a high priority) occurs, interruption with UL transmission can be prevented by preventing a UE from performing an operation to turn off a scheduled SL RF. For example, until UL transmission is completed (or during a pre-configured time period, during a time period indicated by higher layer/physical layer signaling), the UE may suspend/hold/delay an operation of turning off the RF for the SL operation. Alternatively, for example, when UL transmission is completed, a UE may turn off an RF for SL operation. In addition, while the UE is performing the SL DRX operation, at the time of the expiration of the SL DRX off-duration period or at the time of entering the wake up mode (operation of turning on SL RF) for receiving/transmitting SL signals due to the expiration of the SL sleep mode period, when a UL packet having a high transmission priority is generated, interruption with UL transmission can be prevented from occurring by preventing the UE from performing an operation of turning on a scheduled SL RF. For example, until UL transmission is completed (or during a pre-configured time period, during a time period indicated by higher layer/physical layer signaling), the UE may suspend/hold/delay the operation of turning on the RF for the SL operation. Alternatively, for example, the rule of Proposal 5 below (or a rule to reduce interruption caused by On/Off of SL DRX RF), which is a method for reducing interruption caused by On/Off of the SL DRX RF, may not be applied to the UL channel for SR (and/or pre-configured MAC CE (e.g., BSR)) transmission.

Figure 11:
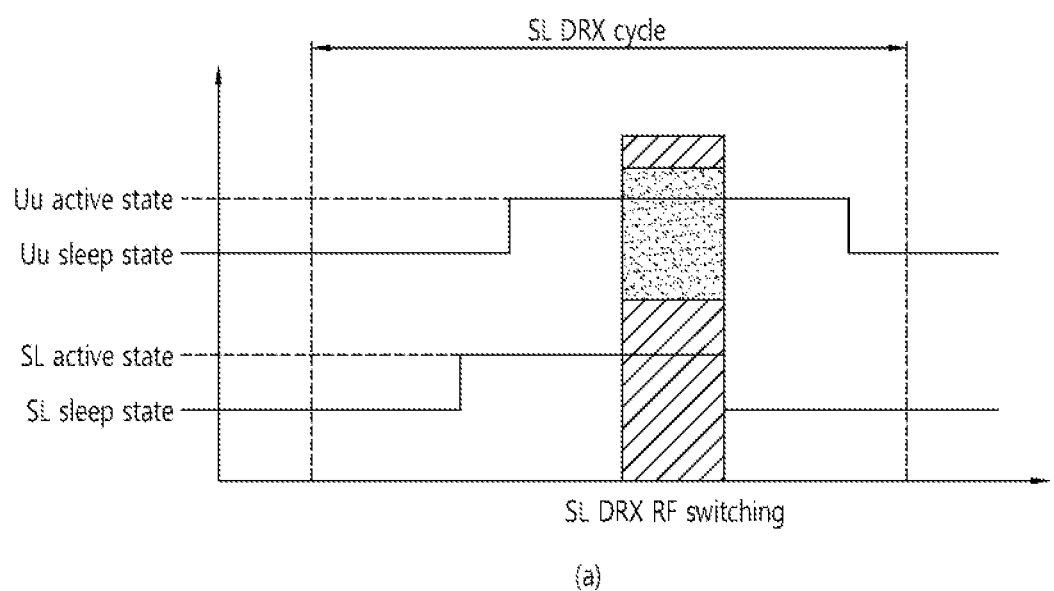
FIG. 11 shows an example in which a switching time point of an RF module related to SL DRX is changed according to an embodiment of the present disclosure.
Figure 11:
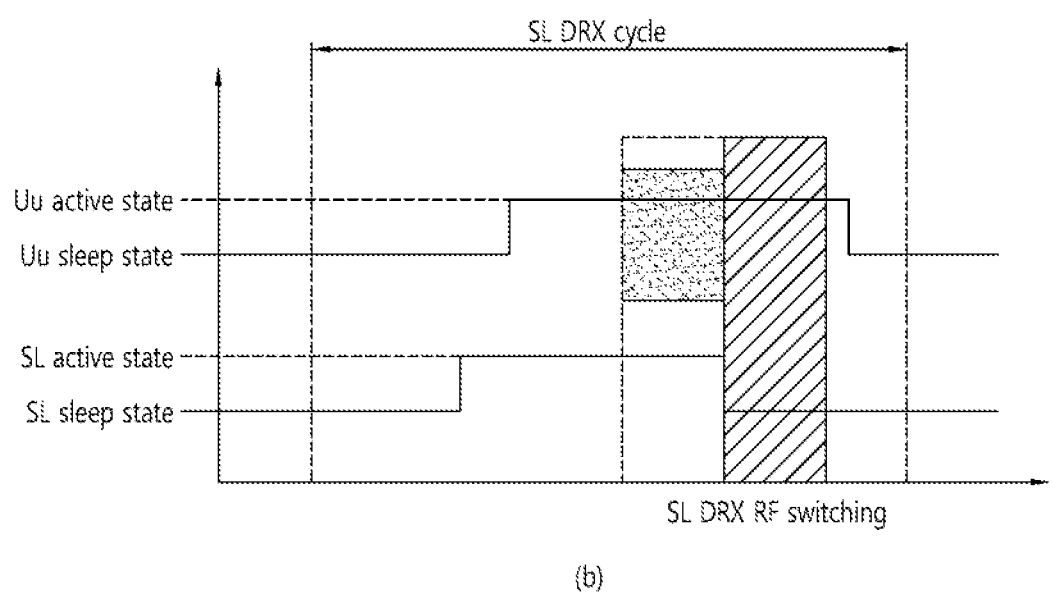

FIG. 11 shows an example in which a switching time point of an RF module related to SL DRX is changed according to an embodiment of the present disclosure. The embodiment of FIG. 11 may be combined with various embodiments of the present disclosure.

Referring to FIG. 11, (a) of FIG. 11 shows a situation in which a switching time point from on to off of an SL DRX RF overlaps with a scheduled UL data transmission time point. That is, interruption may occur because the switching time and the UL data transmission time overlap. (b) of FIG. 11 shows a situation in which the switching timing from on to off of the SL DRX RF is moved backward according to an embodiment of the present disclosure. For example, as the overlap with the transmission time of UL data is removed by moving the switching time of the SL DRX RF backward, interruption with respect to UL transmission may not occur. For example, the UL data may be UL data with a high priority according to an embodiment of the present disclosure.

According to an embodiment of the present disclosure, (proposal 2) due to the on/off of an SL DRX-related RF module, interruption may also occur in DL RX operation, and a UE may adjust the On/Off timing of its RF module so that interruption does not occur with respect to intervals such as SIB reception interval, paging reception interval, and Uu SSB TX/RX resource intervals. That is, the present method may be a method of protecting a relatively important DL RX while reducing a power saving effect.

That is, for example, while a UE is performing an SL DRX operation, at the time when an SL DRX on-duration period expires or at the time of entering the sleep mode (operation of turning off an SL RF) for power saving due to the expiration of an SL active time period, interruption with DL RX can be prevented from occurring, by preventing a UE from performing an operation to turn off the scheduled SL RF when an interval such as SIB reception, paging reception, and Uu SSB TX/RX resource interval arrives. For example, until the DL RX operation is completed, a UE may suspend/hold/delay the operation of turning off the RF for the SL operation. Alternatively, for example, when a DL RX operation is completed, a UE may turn off the RF for an SL operation. In addition, while the UE is performing the SL DRX operation, at the time when the SL DRX off-duration period expires or at the time of entering the wake-up mode (operation to turn on SL RF) for SL signal reception/transmission due to expiration of the SL sleep mode period, when an interval such as SIB reception, paging reception, and Uu SSB TX/RX resource interval arrives, it is possible to prevent interruption in DL RX by preventing the UE from performing an operation of turning on a scheduled SL RF. For example, until the DL RX operation is completed, the UE may suspend/hold/delay the operation of turning on the RF for the SL operation. Alternatively, for example, when a DL RX operation is completed, a UE may turn on an RF for an SL operation.

According to an embodiment of the present disclosure, (proposal 3.) if interruption occurs in SL TX/RX operation due to On/Off of Uu DRX related RF module, it is possible to adjust the On/Off timing of the RF module (related to Uu DRX) by avoiding a pre-configured SL channel/signal transmission/reception period (e.g., transmission/reception of SL packets with an SL priority value smaller than an SL threshold (in particular, transmission/reception of SL packets based on periodically reserved resources), transmission of an SL packet with a higher priority than that of a UL packet (that is, when the priority mapped to the LCH of the SL packet is higher than the SL priority mapped to the LCH of the UL packet), PSFCH resource, SL SSB TX/RX resource). For example, when the SL priority value mapped to the LCH of the SL packet has a value smaller than the SL threshold value, transmission of the SL packet may be considered to be prioritized.

That is, for example, while a UE is performing a UL DRX operation, at the time point of expiration of a UL DRX on-duration period, or at the time point of entering the sleep mode (operation of turning off UL RF) for power saving due to the expiration of the UL active time period, when an SL packet with a high transmission priority (the SL packet with a high priority mentioned in Proposal 3 above) occurs, it is possible to prevent interruption in SL transmission/reception by preventing a UE from performing an operation of turning off a scheduled UL RF. For example, until SL transmission is completed (or for a pre-configured time period, for a time period indicated by higher layer/physical layer signaling), a UE may suspend/hold/delay the operation of turning off the RF for the UL operation. For example, when SL transmission is completed, a UE may turn off the RF for UL operation. In addition, for example, while a UE is performing a UL DRX operation, at the time of the expiration of a UL DRX off-duration period, or at the time of entering the wake-up mode (operation of turning on UL RF) for UL signal reception/transmission due to the expiration of the UL sleep mode interval, when an SL packet with a high transmission priority (the SL packet with a high priority mentioned in Proposal 3 above) occurs, interruption in SL transmission can be prevented by preventing the UE from performing an operation of turning on a scheduled UL RF. Or, for example, until SL transmission is completed (or during a pre-configured time period, during a time period indicated by higher layer/physical layer signaling), a UE may suspend/hold/delay the operation of turning on the RF for the UL operation. For example, when SL transmission is completed, the UE may turn on RF for UL operation.

According to an embodiment of the present disclosure, (proposal 4.) for predefined signaling (e.g., MAC CE, RRC, PUSCH/PUCCH) reported by a UE to a base station, the UE may report information on (time) resources that are likely to cause interruption to the UL TX operation due to On/Off of an SL DRX related RF module to the base station (e.g. via dedicated RRC message, MAC CE), or a base station may inform a UE of information on allowed resources that may cause interruption to UL TX operation due to On/Off of an SL DRX related RF module through predefined signaling (e.g. MAC CE, RRC, PUSCH/PUCCH transmission). In addition, for example, a UE performing SL communication may notify a neighboring UE (neighbor UE or target UE without PC5 unicast connection and PC5 RRC connection (counterpart UE with PC5 unicast connection and PC5 RRC connection)) of information about an interval in which interruption occurs due to On/Off of the UU DRX RF through predefined signaling (e.g., PC5 RRC, MAC CE, physical layer signal, etc.). For example, reporting the resource information to a base station by a UE may be for the purpose of performing UL/DL scheduling (of a relatively high priority configured in advance) by avoiding the corresponding (time) resource reported by the base station from the UE. In addition, for example, the rule of Proposal 4, which is a method for reducing interruption due to On/Off of an SL DRX RF (or a rule for reducing interruption due to On/Off of an SL DRX RF), may not be applied to a UL channel for SR (and/or preconfigured MAC CE (e.g., BSR)) transmission.

Figure 12:
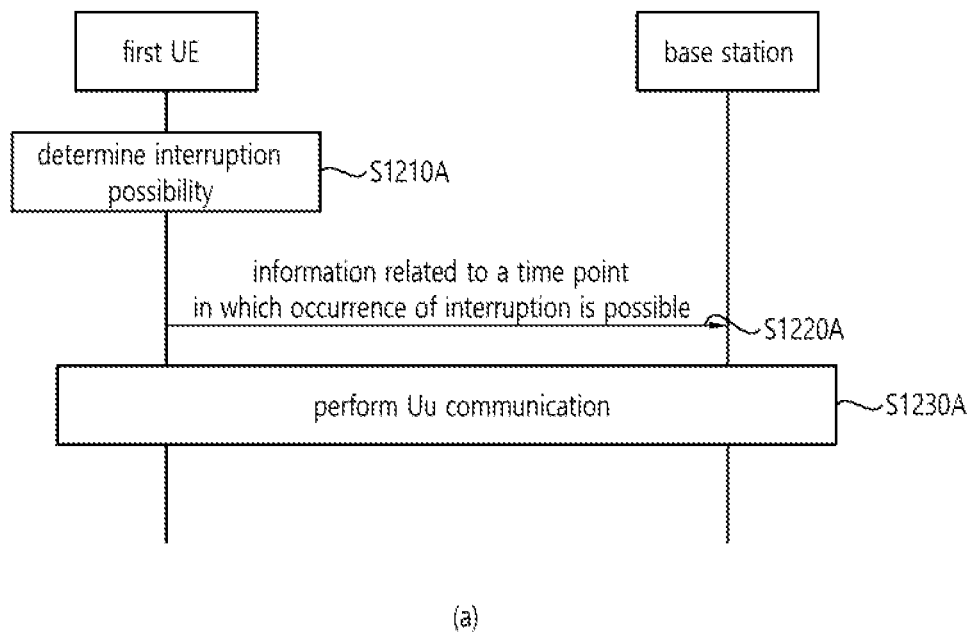
FIG. 12 shows a procedure for performing wireless communication by a first UE according to an embodiment of the present disclosure.
Figure 12:
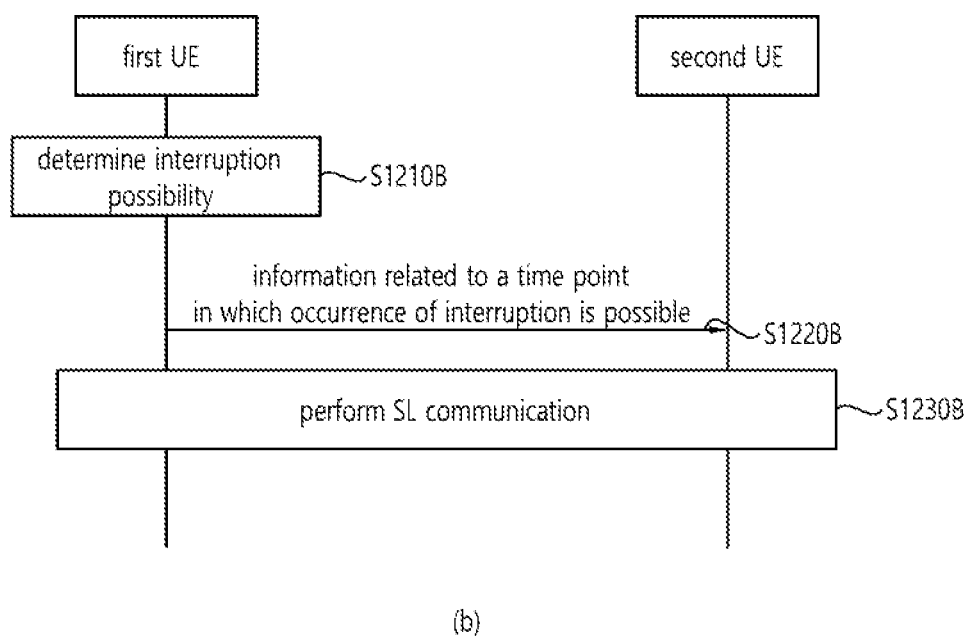

FIG. 12 shows a procedure for performing wireless communication by a first UE according to an embodiment of the present disclosure. The embodiment of FIG. 12 may be combined with various embodiments of the present disclosure.

Referring to FIG. 12, in (a) of FIG. 12, a first UE performing Uu communication is shown. In step S1210A, the first UE may determine that interruption may occur in Uu communication due to SL DRX-related RF switching in a specific resource. In step S1220A, the first UE may transmit information related to the specific resource and the possibility of interruption of the specific resource to a base station. In step S1230A, the first UE and the base station may perform Uu communication based on the information. For example, the base station may perform UL resource scheduling among resources other than the specific resource. Alternatively, the first UE may move the switching time point.

In (b) of FIG. 12, a first UE and a second UE performing SL communication are shown. In step S1210B, the first UE may determine that interruption may occur in SL communication by Uu DRX-related RF switching in a specific resource. In step S1220B, the first UE may transmit information related to the specific resource and the possibility of interruption of the specific resource to the second UE. In step S1230B, the first UE and the second UE may perform SL communication based on the information. For example, the SL communication may be performed in a resource other than the specific resource. Alternatively, the first UE may move the switching time point.

According to an embodiment of the present disclosure, (proposal 5.) whether to allow interruption due to DRX RF (Uu DRX RF or SL DRX RF) On/Off may be determined by simultaneously considering "the priority of target service (and/or channel) related to DRX RF (Uu DRX RF or SL DRX RF) On/Off" and "the priority of service (and/or channel) that suffers from interruption due to DRX RF (Uu DRX RF or SL DRX RF) On/Off operation" as well as "the priority of the service (and/or channel) that suffers from interruption". For example, if the latter has a higher priority than the former, interruption due to On/Off of the former DRX RF (Uu DRX RF or SL DRX RF) may not be allowed (for the latter).

According to an embodiment of the present disclosure, (proposal 6.) a threshold value of an SL (TX/RX) priority (and/or channel) in which interruption due to UU DRX-related RF On/Off is allowed may be configured/applied differently according to the congestion level of a resource pool, whether SL HARQ feedback is active, whether the remaining PDB exceeds a pre-configured threshold, etc. Here, it is assumed/premised/configured as a packet/service with a higher importance as the priority value is lower. For example, the higher the congestion level, the lower the probability of retransmission of an SL transmission dropped by a CR limit value, and in this case, the threshold value may be configured relatively high. For example, when (some) SL transmissions related to SL HARQ feedback enabled MAC PDUs are dropped, a retransmission may be possible based on the feedback received from a receiving UE, and in this case, the threshold value may be configured relatively low. For example, if the remaining PDB value does not exceed a threshold, the probability of retransmission of the dropped SL transmission may be low, and in this case, the threshold may be configured relatively high.

According to an embodiment of the present disclosure, when the above-described proposed methods (proposal 1, proposal 2, proposal 3, and proposal 4) are applied, it can be interpreted/considered that the On/Off timing of an RF module is adjusted, and that DRX-related operations/parameters are not changed (in the time domain). Alternatively, for example, when the above-described proposed methods (proposition 1, proposal 2, proposal 3, proposal 4) are applied, the On/Off timing of an RF module is adjusted, but DRX-related operations/parameters (in the time domain) may not be changed. For example, the DRX related operation/parameter may include an on-duration or active time interval, a PSCCH monitoring operation, a timer operation, and the like.

For example, an SL DRX timer for support of an SL DRX operation mentioned in this disclosure may be as follows. Hereinafter, each timer is not limited by its name, and when a specific timer actually performs the same function as the timer described below, even if it is different from the represented name, it can be regarded as the same timer.

SL drx-onDurationTimer: a timer for duration at start of a DRX cycle; a timer that allows a UE to basically maintain a wake-up state in order to monitor an SL signal.

SL drx-InactivityTimer: a timer for a duration after PSCCH generation indicating new SL transmission for a MAC entity; a timer that allows a UE to maintain the wake-up state by extending an SL drx-onDurationTimer period to monitor an SL signal. That is, the SL drx-onDuration interval may be extended by the SL drx-InactivityTimer interval.

SL drx-RetransmissionTimer (per HARQ process): a timer for a maximum interval until a grant for SL retransmission is received; That is, SL drx-RetransmissionTimer-TX is a timer that starts when SL drx-HARQ-RTT-Timer-TX expires, and is a timer that causes a transmitting UE to transition to an active state for HARQ retransmission. For example, a transmitting UE may start monitoring whether retransmission resources (e.g., a grant for SL retransmission) to a receiving UE are ready from the start of SL drx-RetransmissionTimer-TX, and perform SL HARQ retransmission to the receiving UE when the retransmission resources are ready. A transmitting UE may transmit an HARQ retransmission packet to a receiving UE and stop SL drx-RetransmissionTimer-TX. For example, while an SL drx-RetransmissionTimer-TX is running, a UE can maintain an active state.

Alternatively, SL drx-RetransmissionTimer-RX (per HARQ process): a timer for a maximum interval until sidelink control information (PSCCH) and PSSCH for SL HARQ retransmission are received; it may be defined as a timer for a time for a receiving UE to monitor a PSCCH and PSSCH in order to receive an SL HARQ retransmission transmitted by a transmitting UE. For example, when the SL drx-HARQ-RTT-Timer-RX expires, For example, the receiving UE may start an operation of receiving the PSCCH and the PSSCH for SL HARQ retransmission transmitted by the transmitting UE, by transitioning to active state and starting SL drx-RetransmissionTimer-RX. While the SL drx-RetransmissionTimer-RX timer is running, if the receiving UE receives the SL HARQ retransmission transmitted by the transmitting UE, the receiving UE may stop the SL drx-RetransmissionTimer-RX.

SL drx-HARQ-RTT-Timer (per HARQ process): a timer for the minimum period before a MAC entity expects a SL HARQ retransmission grant. It may be a timer for a minimum time taken until resources for HARQ retransmission are ready. That is, resources for SL HARQ retransmission may not be prepared until SL drx-HARQ-RTT-Timer-TX. Accordingly, the transmitting UE can reduce power consumption by transitioning to the sleep mode while the SL drx-HARQ-RTT-Timer-TX is in operation. When SL drx-HARQ-RTT-Timer-TX expires, since the transmitting UE determines that resources for SL retransmission can be prepared, the transmitting UE may start the SL drx-RetransmissionTimer-TX timer and monitor whether resources for SL HARQ retransmission are received. For example, because SL HARQ retransmission resources may be or may not be received as soon as SL drx-HARQ-RTT-Timer-TX expires, the transmitting UE may start an SL drx-RetransmissionTimer-TX and monitor whether resources for SL HARQ retransmission are received.

Alternatively, SL drx-HARQ-RTT-Timer-RX (per HARQ process): a timer for a minimum period before PSCCH and PSSCH for SL HARQ retransmissions are expected from a MAC entity of a receiving UE. For example, when the MAC entity of the receiving UE receives and successfully decodes a PSCCH transmitted by a transmitting UE, and fails to decode the received PSSCH (SL data) and transmits HARQ NACK to the transmitting UE, it may be defined as the minimum time required for the receiving UE to monitor the PSCCH and PSSCH for the SL HARQ retransmission packet transmitted by the transmitting UE. That is, it may mean that the PSCCH & PSSCH for SL HARQ retransmission are not transmitted from the transmitting UE before the SL drx-HARQ-RTT-Timer-RX expires. For example, the receiving UE may operate in a sleep mode while SL drx-HARQ-RTT-Timer-RX is running, and transition to an active state and start SL drx-RetransmissionTimer-RX when SL drx-HARQ-RTT-Timer-RX expires.

For example, the proposal of the present disclosure may be a solution that can be applied and extended as a method of solving a problem in which loss occurs due to interruption occurring when switching a Uu bandwidth part (BWP).

In addition, for example, the proposal of the present disclosure may be a solution that can be applied and extended as a method of solving a problem in which loss occurs due to interruption occurring during SL BWP switching when a UE supports SL multiple BWP.

The on-duration term mentioned in the proposal of the present disclosure may be extended and interpreted as an active time period (a period in which a UE operates in a wake-up state (RF module is "On") to receive/transmit a radio signal). In addition, "whether or not (some) proposed methods/rules of the present disclosure are applied and/or related parameters (e.g., threshold values) may be configured specifically (or differently or independently) according to resource pool, congestion level, service priority (and/or type), requirements (e.g., delay, reliability), traffic type (e.g., (a)periodic generation), SL transmission resource allocation mode (mode 1, mode 2), etc.

Figure 13:
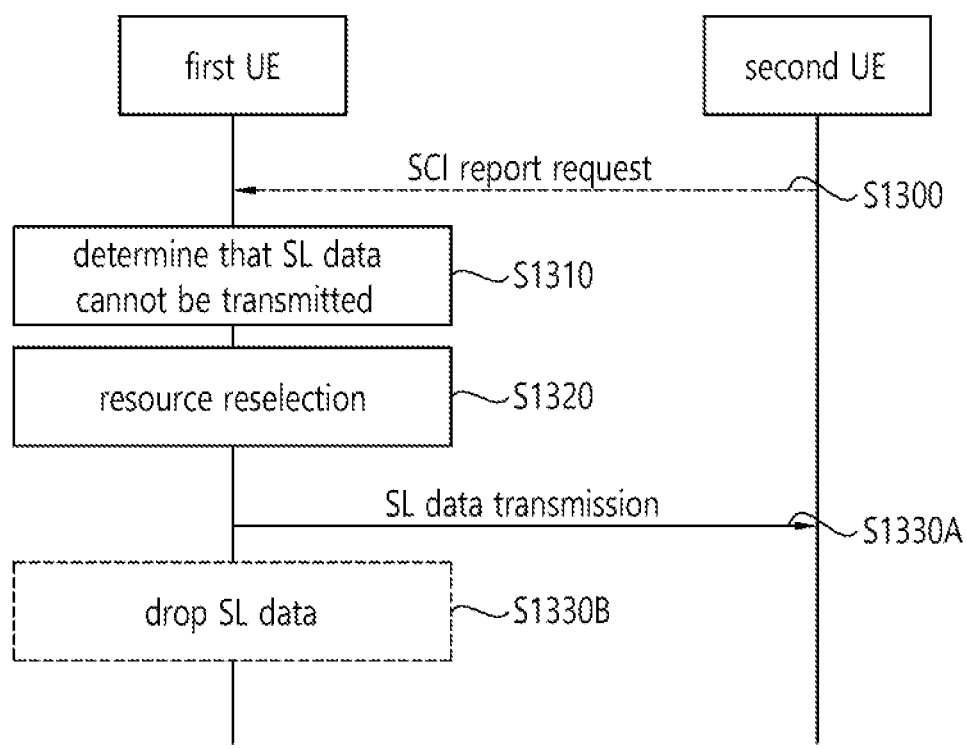
FIG. 13 shows a procedure for performing SL communication by a first UE according to an embodiment of the present disclosure.

FIG. 13 shows a procedure for performing SL communication by a first UE according to an embodiment of the present disclosure. The embodiment of FIG. 13 may be combined with various embodiments of the present disclosure.

Referring to FIG. 13, in step S1310, a first UE may determine that SL data cannot be transmitted through a specific resource. For example, the SL data may not be transmitted because RF switching related to a DRX operation of Uu communication is performed in the specific resource. In step S1320, the first UE may perform resource reselection to transmit the data. For example, the resource reselection may be performed from a resource pool excluding the specific resource. In step S1330A, the first UE may transmit the SL data to the second UE through the reselected second resource. Alternatively, for example, in step S1300, the second UE may have transmitted an SCI report request to the first UE, and the SL data may include an SCI report related to the SCI report request. And, for example, when resource reselection cannot be performed within a delay budget related to the SCI reporting, the first device may drop the SL data in step S1330B.

According to an embodiment of the present disclosure, when a Uu RF chain and an SL RF chain are independently operated, interruption between links (Uu link and SL link) may be caused. For example, when a UE turns on or off an RF module in relation to an SL DRX operation, interruption may occur and loss may occur in UL TX (and/or DL RX) operation, but through the proposed method of the present disclosure, it is possible to prevent loss of UL TX (and/or DL RX) operation by preventing interruption from occurring.

Figure 14:
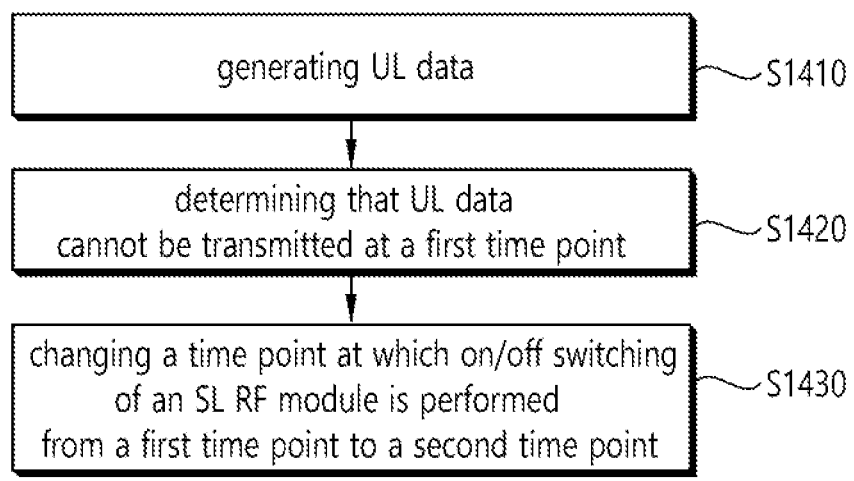
FIG. 14 shows a procedure for performing wireless communication by a first device according to an embodiment of the present disclosure.

FIG. 14 shows a procedure for performing wireless communication by a first device according to an embodiment of the present disclosure. The embodiment of FIG. 14 may be combined with various embodiments of the present disclosure.

Referring to FIG. 14, in step S1410, a first device may generate uplink (UL) data. In step S1420, the first device may determine that the UL data cannot be transmitted at a first time point, based on on/off switching of a sidelink (SL) radio frequency (RF) module, related to an SL discontinuous reception (DRX) configuration, performed at the first time point. In step S1430, the first device may change a time point at which on/off switching of the SL RF module is performed from the first time point to a second time point, based on the determination that the UL data cannot be transmitted at the first time point and a priority value related to the UL data less than a threshold.

For example, the UL data may be determined as cannot be transmitted at the first time point, based on interruption that occurs based on on/off switching of the SL RF module.

For example, the interruption may occur in a retransmission resource related to the UL data.

For example, the time point at which on/off switching of the SL RF module is performed may be not changed to the second time point, based on the priority value related to the UL data greater than the threshold.

For example, additionally, the first device may drop the UL data in a UL resource within the first time point, based on the time point at which on/off switching of the SL RF module is performed being not changed to the second time point.

For example, additionally, the first device may transmit, to a base station, a scheduling request (SR) for transmitting the UL data, based on the determination that the UL data cannot be transmitted at the first time point; receive, from the base station, a first UL grant for buffer status report (BSR) as a response to the SR; transmit, to the base station, BSR based on the first UL grant; receive, from the base station, a second UL grant for the UL data; and retransmit, to the base station, the UL data based on the second UL grant.

For example, additionally, the first device may determine that a hybrid automatic repeat request (HARQ) feedback cannot be received through a physical sidelink feedback channel (PSFCH) at a third time point, based on on/off switching of a Uu RF module related to a Uu DRX configuration, performed at the third time point; and transmit, to a base station, a HARQ negative acknowledge (NACK), based on the determination that the HARQ feedback cannot be received at the third time point.

For example, additionally, the first device may determine that SL data cannot be transmitted to a second device at a third time point, based on on/off switching of a Uu RF module related to a Uu DRX configuration, performed at the third time point.

For example, additionally, the first device may select an SL resource through resource reselection procedure, based on the determination that the SL data cannot be transmitted at the third time point; and transmit, to the second device, the SL data based on the SL resource. For example, the SL resource may be selected outside the third time point.

For example, additionally, the first device may receive, from the second device, a sidelink control information (SCI) report request. For example, the SL data may be an SCI report.

For example, the SL resource may be selected within latency budget related to the SCI report.

For example, additionally, the first device may drop the SL data, based on the SL resource cannot being selected within the latency budget.

For example, additionally, the first device may change a time point at which on/off switching of the Uu RF module is performed from the third time point to a fourth time point, based on the determination that the SL data cannot be transmitted at the third time point and a priority value related to the SL data less than a threshold.

The above-described embodiment may be applied to various devices described below. For example, a processor 102 of a first device 100 may generate uplink (UL) data. And, the processor 102 of the first device 100 may determine that the UL data cannot be transmitted at a first time point, based on on/off switching of a sidelink (SL) radio frequency (RF) module, related to an SL discontinuous reception (DRX) configuration, performed at the first time point. And, the processor 102 of the first device 100 may change a time point at which on/off switching of the SL RF module is performed from the first time point to a second time point, based on the determination that the UL data cannot be transmitted at the first time point and a priority value related to the UL data less than a threshold.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: generate uplink (UL) data; determine that the UL data cannot be transmitted at a first time point, based on on/off switching of a sidelink (SL) radio frequency (RF) module, related to an SL discontinuous reception (DRX) configuration, performed at the first time point; and change a time point at which on/off switching of the SL RF module is performed from the first time point to a second time point, based on the determination that the UL data cannot be transmitted at the first time point and a priority value related to the UL data less than a threshold.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: generate uplink (UL) data; determine that the UL data cannot be transmitted at a first time point, based on on/off switching of a sidelink (SL) radio frequency (RF) module, related to an SL discontinuous reception (DRX) configuration, performed at the first time point; and change a time point at which on/off switching of the SL RF module is performed from the first time point to a second time point, based on the determination that the UL data cannot be transmitted at the first time point and a priority value related to the UL data less than a threshold.

According to an embodiment of the present disclosure, a non-transitory computer-readable storage medium storing instructions may be proposed. For example, the instructions, when executed, may cause a first device to: generate uplink (UL) data; determine that the UL data cannot be transmitted at a first time point, based on on/off switching of a sidelink (SL) radio frequency (RF) module, related to an SL discontinuous reception (DRX) configuration, performed at the first time point; and change a time point at which on/off switching of the SL RF module is performed from the first time point to a second time point, based on the determination that the UL data cannot be transmitted at the first time point and a priority value related to the UL data less than a threshold.

FIG. 15 shows a procedure for a base station to perform wireless communication according to an embodiment of the present disclosure. The embodiment of FIG. 15 may be combined with various embodiments of the present disclosure.

Referring to FIG. 15, in step S1510, a base station may receive, from a first device, UL data at a first time point. For example, a time point at which on/off switching of a sidelink (SL) radio frequency (RF) module is performed may be changed from the first time point to a second time point, based on determination that the UL data cannot be transmitted at the first time point, based on on/off switching of the SL RF module related to an SL discontinuous reception (DRX) configuration.

For example, the UL data may be determined as cannot be transmitted at the first time point, based on interruption that occurs based on on/off switching of the SL RF module.

The above-described embodiment may be applied to various devices described below. For example, a processor 302 of a base station 300 may control transceiver 306 to receive, from a first device 100, UL data at a first time point. For example, a time point at which on/off switching of a sidelink (SL) radio frequency (RF) module is performed may be changed from the first time point to a second time point, based on determination that the UL data cannot be transmitted at the first time point, based on on/off switching of the SL RF module related to an SL discontinuous reception (DRX) configuration.

According to an embodiment of the present disclosure, a base station for performing wireless communication may be proposed. For example, the base station may comprise: one or more memories storing instructions; one or more transceivers; and one or more processors connected to the one or more memories and the one or more transceivers. For example, the one or more processors may execute the instructions to: receiving, from a first device, UL data at a first time point, wherein a time point at which on/off switching of a sidelink (SL) radio frequency (RF) module is performed may be changed from the first time point to a second time point, based on determination that the UL data cannot be transmitted at the first time point, based on on/off switching of the SL RF module related to an SL discontinuous reception (DRX) configuration.

For example, the UL data may be determined as cannot be transmitted at the first time point, based on interruption that occurs based on on/off switching of the SL RF module.

If a UE performing both Uu communication and SL communication performs on/off switching of an RF module in relation to an SL DRX operation, it may cause interruption to Uu communication, and it may be difficult to transmit UL data with a high priority at a specific time point. Through the method proposed in the present disclosure, a UE may move the on/off switching time point of an RF module related to an SL DRX operation, and thus the UE can transmit UL data with a high priority at the specific time point.

According to an embodiment of the present disclosure, when a transmission resource allocation mode 1 transmitting UE fails to receive a PSFCH from a receiving UE due to Uu DRX-related RF On/Off, the transmitting UE may report NACK information to a base station through PUCCH. In addition, for example, if a transmission resource allocation mode 1 transmitting UE fails to transmit a MAC PDU to a receiving UE due to Uu DRX-related RF On/Off (and/or omits some transmission related to MAC PDU), the transmitting UE may report NACK information through PUCCH. That is, when SL transmission is not successfully completed in the current mode 1 transmission resource region due to Uu DRX-related RF On/Off, by reporting SL HARQ NACK information to the base station, the UE can be allocated retransmission resources for SL transmission that has not been completed due to Uu DRX-related RF On/Off. For example, this rule may be exceptionally applied only when a transmitting UE performs a blind retransmission operation. For example, blind retransmission may refer to a method in which a transmitting UE transmits a retransmission packet to a receiving UE without receiving SL HARQ feedback from the receiving UE.

According to an embodiment of the present disclosure, when a transmitting UE fails to receive (or monitor) a PSFCH due to Uu DRX-related RF On/Off, the unreceived PSFCH may not be included (or (still) included) in the SL RLF related DTX counting. That is, for example, in the prior art, when a transmitting UE does not receive a HARQ feedback for a PSCCH/PSSCH transmitted to a receiving UE, the transmitting UE may regard it as SL HARQ DTX related to the HARQ feedback and increase the SL HARQ DTX count by 1. In addition, the transmitting UE may declare SL RLF when the SL HARQ DTX count reaches the maximum threshold value configured by a base station. According to the proposal of the present disclosure, when a transmitting UE fails to perform PSFCH reception (or monitoring) due to Uu DRX related RF On/Off, by not including the unperformed PSFCH reception in the SL RLF related DTX counting, if PSFCH monitoring is not performed due to DRX-related RF On/Off, a situation that is regarded as an SL HARQ DTX situation even though the actual SL radio environment is good (radio environment in which the transmitting UE could successfully receive the SL HARQ feedback transmitted by the receiving UE by performing PSFCH monitoring if the transmitting UE did not turn on/off the Uu DRX RF) can be prevented.

According to an embodiment of the present disclosure, in the case of omitted transmission (SL transmission or Uu UL transmission) due to On/Off-related interruption of DRX (Uu DRX or SL DRX) RF, a method in which a transmitting UE (e.g., a mode 1 UE or a UL UE) exceptionally requests (re)transmission resources through SR (and/or BSR) transmission is proposed. Also, for example, on/off related interruption of DRX (Uu DRX or SL DRX) RF may be limited to retransmission resources.

According to an embodiment of the present disclosure, a method of performing SL transmission (e.g. including SL CSI in the form of MAC CE) that has not been performed (or omitted) due to On/Off of Uu DRX-related RF by a transmitting UE by triggering resource reselection (Mode 1 resource re-request or Mode 2 resource re-selection) is proposed. That is, for example, this method may be a form of supplementing dropped SL transmission. Here, for example, when SL CSI reporting transmission is omitted and resource reselection for this is triggered, a UE may select a retransmission resource from resources belonging to a time region from the time of receiving the SL CSI report request message (e.g., SCI) to the CSI report latency budget (exchanged through PC5 RRC signaling). For example, if it is impossible to select a retransmission resource within the corresponding time region (and/or when there are no selectable resources within the time region, or when there are less than a pre-configured threshold number of selectable resources within the time region), the UE may omit transmission of the SL CSI report. In addition, for example, an SL transmission UE may perform resource selection in an interval excluding an interval in which interruption occurs due to On/Off of the Uu DRX RF.

For example, in the present disclosure, the term "interruption (or, interference)" may be extended and interpreted as a communication pause (time) region (and/or communication pause (time) region caused by cell activation/deactivation (switching)) caused by RF retuning (and/or numerology change) related to BWP switching, in addition to the communication pause (time) region caused by RF On/Off (switching) related to DRX operation. In addition, for example, the proposed rules/methods on the present disclosure may also be extended to a situation in which interruption (or, interference) occurs on another cell (group) (and/or carrier) due to the occurrence of the above-described cause on a specific cell (group) (and/or carrier), in addition to interruption (or, interference) situations caused by (some) causes described above on the same cell (group) (and/or carrier).

According to an embodiment of the present disclosure, when a Uu RF chain and an SL RF chain are independently operated, interruption between links (Uu link and SL link) may be caused. For example, when a UE turns on or off the RF in relation to a Uu DRX operation, interruption may occur and loss may occur in an SL TX (and/or SL RX) operation, but through the proposed method of the present disclosure, it is possible to prevent loss of SL TX (and/or SL RX) operation by preventing interruption from occurring. In addition, for example, when a UE turns on or off an RF module in relation to an SL DRX operation, interruption may occur and loss may occur in UL TX (and/or DL RX) operation, but through the proposed method of the present disclosure, it is possible to prevent loss of UL TX (and/or DL RX) operation by preventing interruption from occurring.

According to an embodiment of the present disclosure, in an SL DRX on-duration period, the following method is proposed in order for a transmitting UE to trigger the wake-up of a target receiving UE with high reliability.

For example, in the case of SL service/packet transmission with a priority value smaller than a pre-configured threshold (or delay budget (or high reliability) requirement shorter than a pre-configured threshold), a method of configuring the maximum allowable transmit power value and/or (TB-related) maximum number of retransmissions allowed and/or CR limit values, etc. on the SL DRX on-duration (regarding congestion control) relatively higher than the active time period in which an SL DRX operation is not performed is proposed. Here, for example, it is assumed that a packet/service with a higher importance is assumed as the priority value is smaller. For example, in SL DRX on-duration (or active time period during SL DRX operation), in the case of SL service/packet transmission with a priority value less than a pre-configured threshold (or a delay budget (or high reliability) requirement that is shorter than a pre-configured threshold), the maximum allowable transmit power value and/or (TB-related) maximum number of retransmissions allowed and/or CR limit values, etc. on the SL DRX on-duration (Regarding congestion control) may be delivered from a base station to a UE through a dedicated RRC message/SIB, or pre-configured to a UE.

According to an embodiment of the present disclosure, when SL transmission is omitted due to UL-SL prioritization, pre-emption, etc. on an SL DRX on-duration period, when SL retransmission is difficult (based on resource reselection triggering) considering the remaining packet delay budget (PDB), etc. (and/or if the number of (TB related) SL transmission omissions due to UL-SL prioritization, pre-emption, etc. on the SL DRX on-duration period exceeds a pre-configured threshold), a transmitting UE may maintain its own SL transmission (SL transmission omitted due to UL-SL prioritization, pre-emption, etc. on SL DRX on-duration period) (regardless of priority). Here, for example, such a rule may be limited to SL service/packet transmission with a priority value smaller than a pre-configured threshold value (or, of delay budget (or high reliability) requirement that is shorter than a pre-configured threshold).

According to an embodiment of the present disclosure, a method of limiting interruption caused by On/Off of a Uu DRX RF in an SL DRX on-duration period is proposed. That is, a UE may be restricted not to perform an On or Off operation of a Uu DRX RF in an SL DRX on-duration period.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
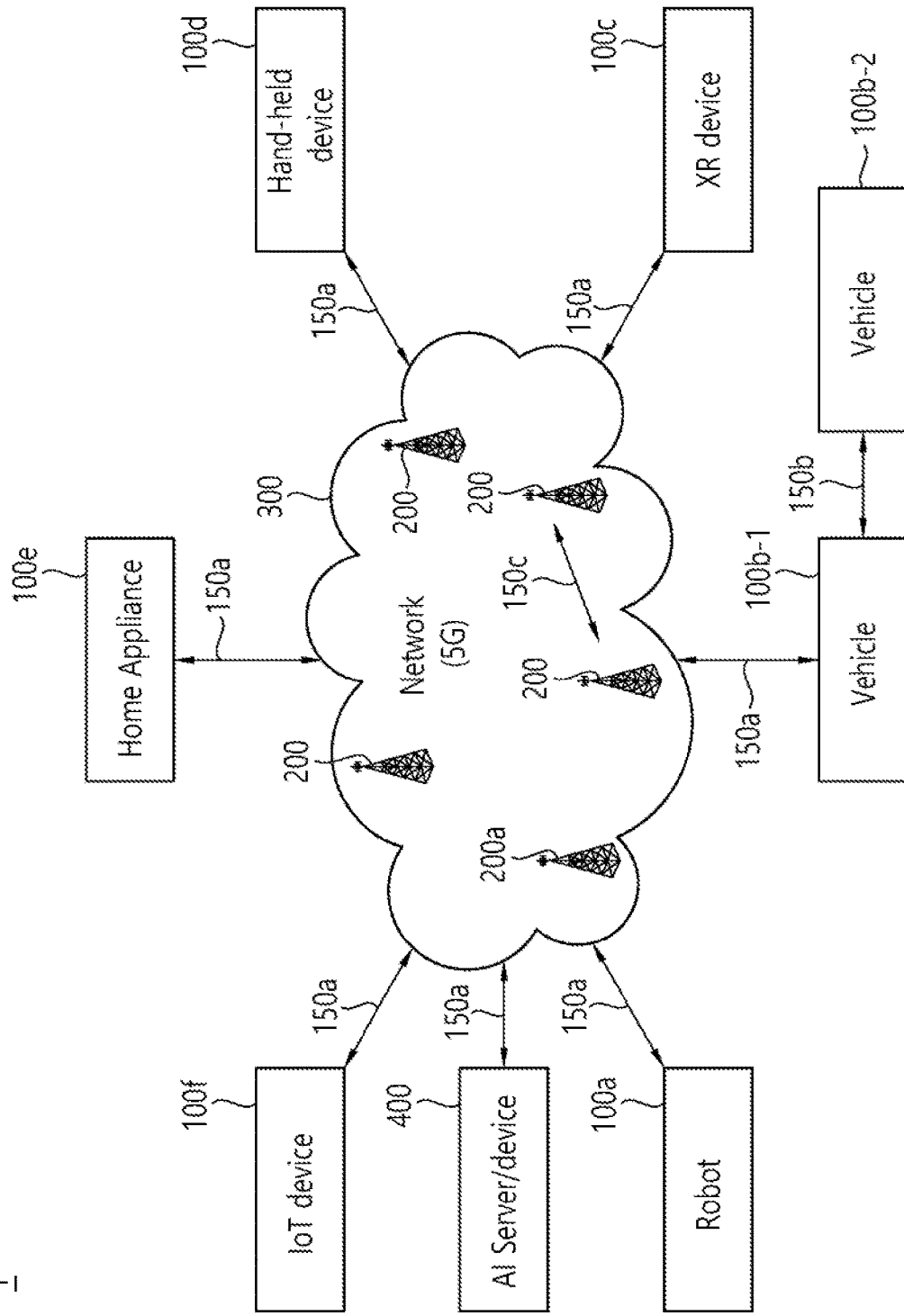
FIG. 16 shows a communication system 1, based on an embodiment of the present disclosure.

FIG. 16 shows a communication system 1, based on an embodiment of the present disclosure. The embodiment of FIG. 16 may be combined with various embodiments of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
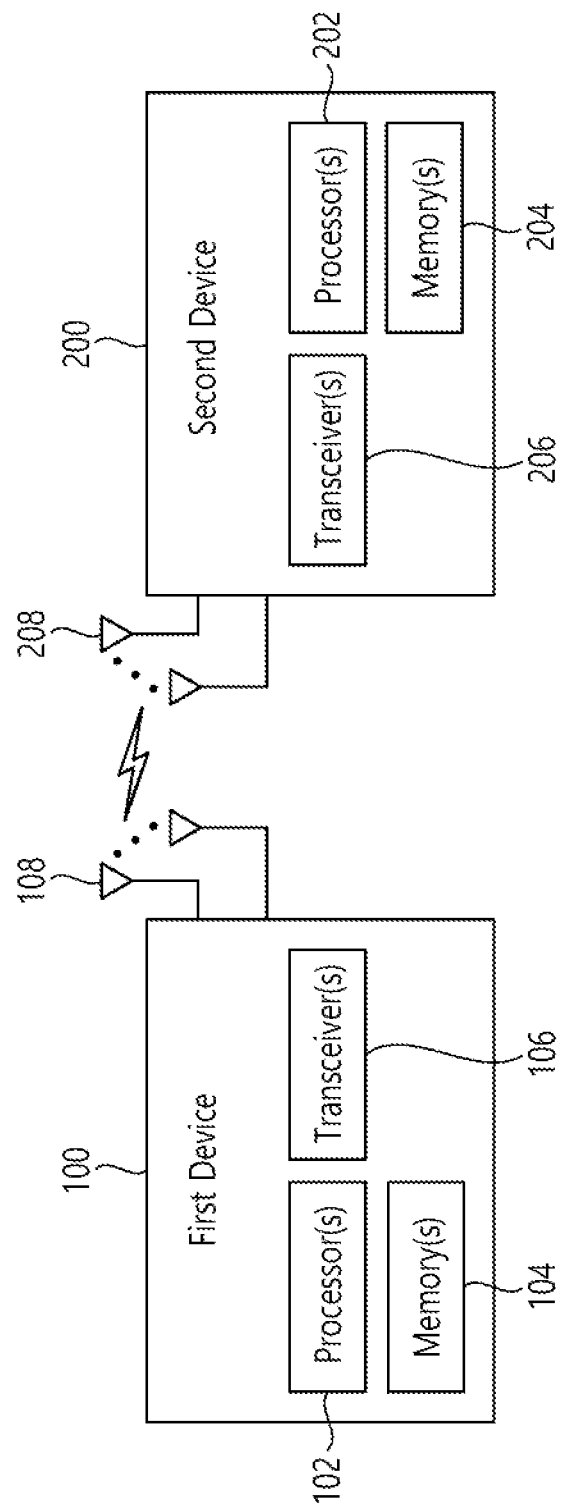
FIG. 17 shows wireless devices, based on an embodiment of the present disclosure.

FIG. 17 shows wireless devices, based on an embodiment of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
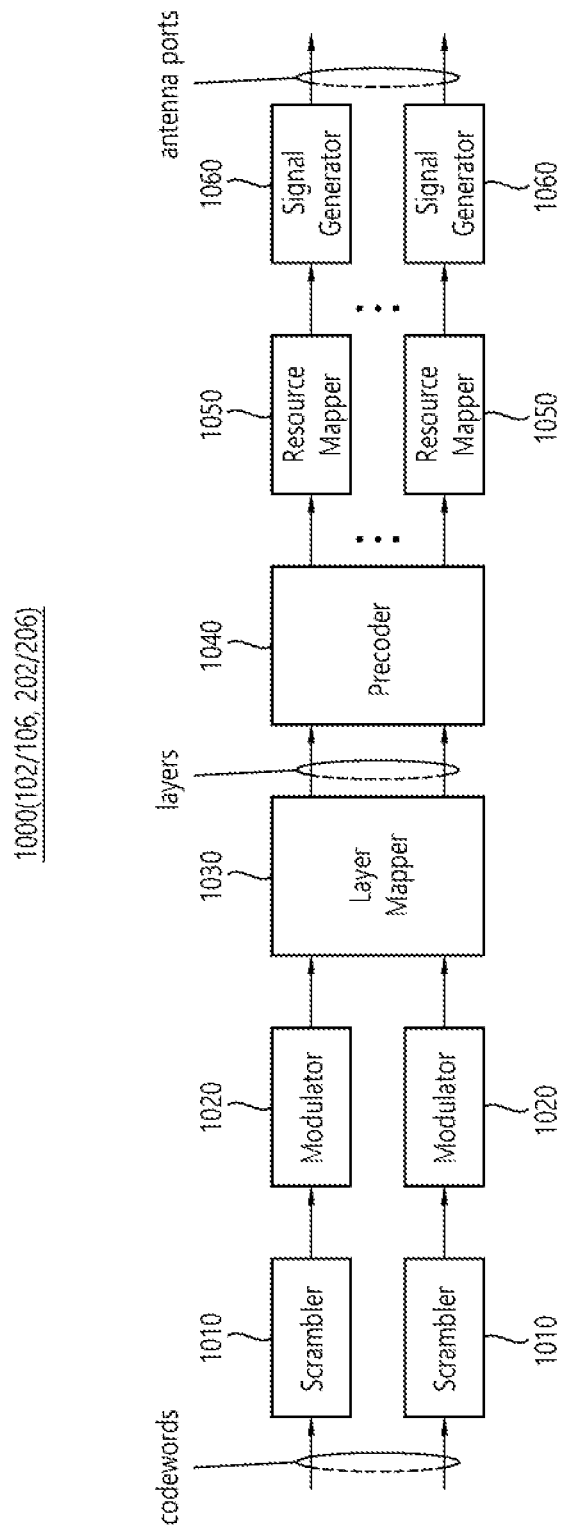
FIG. 18 shows a signal process circuit for a transmission signal, based on an embodiment of the present disclosure.

FIG. 18 shows a signal process circuit for a transmission signal, based on an embodiment of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
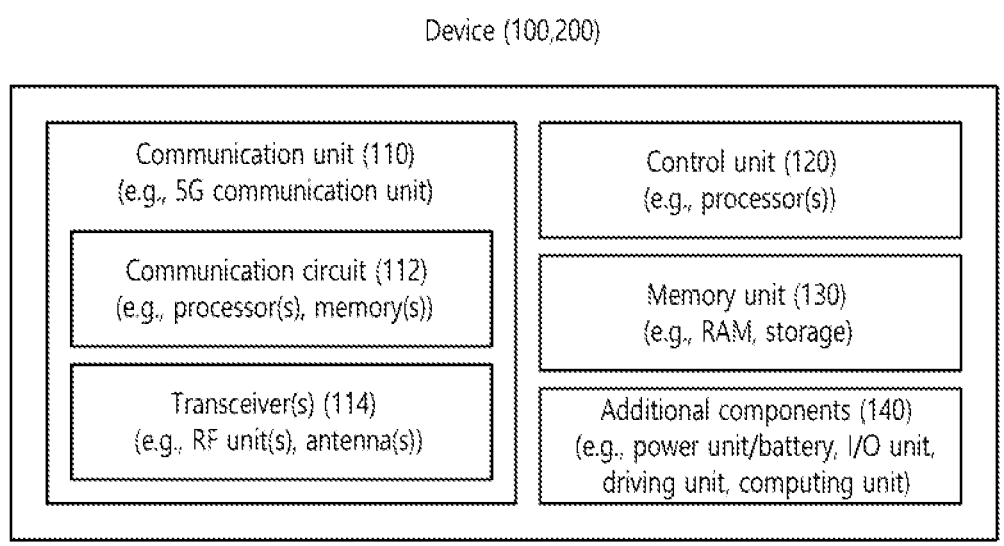
FIG. 19 shows another example of a wireless device, based on an embodiment of the present disclosure.

FIG. 19 shows another example of a wireless device, based on an embodiment of the present disclosure. The wireless device may be implemented in various forms according to a use-case/service (refer to FIG. 16).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
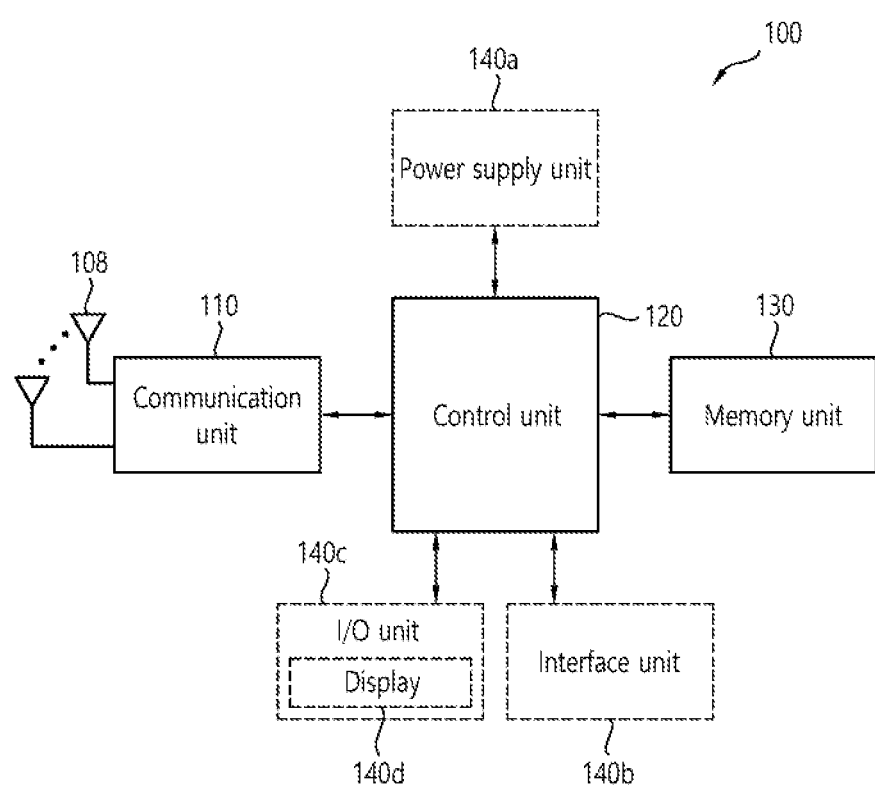
FIG. 20 shows a hand-held device, based on an embodiment of the present disclosure.

FIG. 20 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 21:
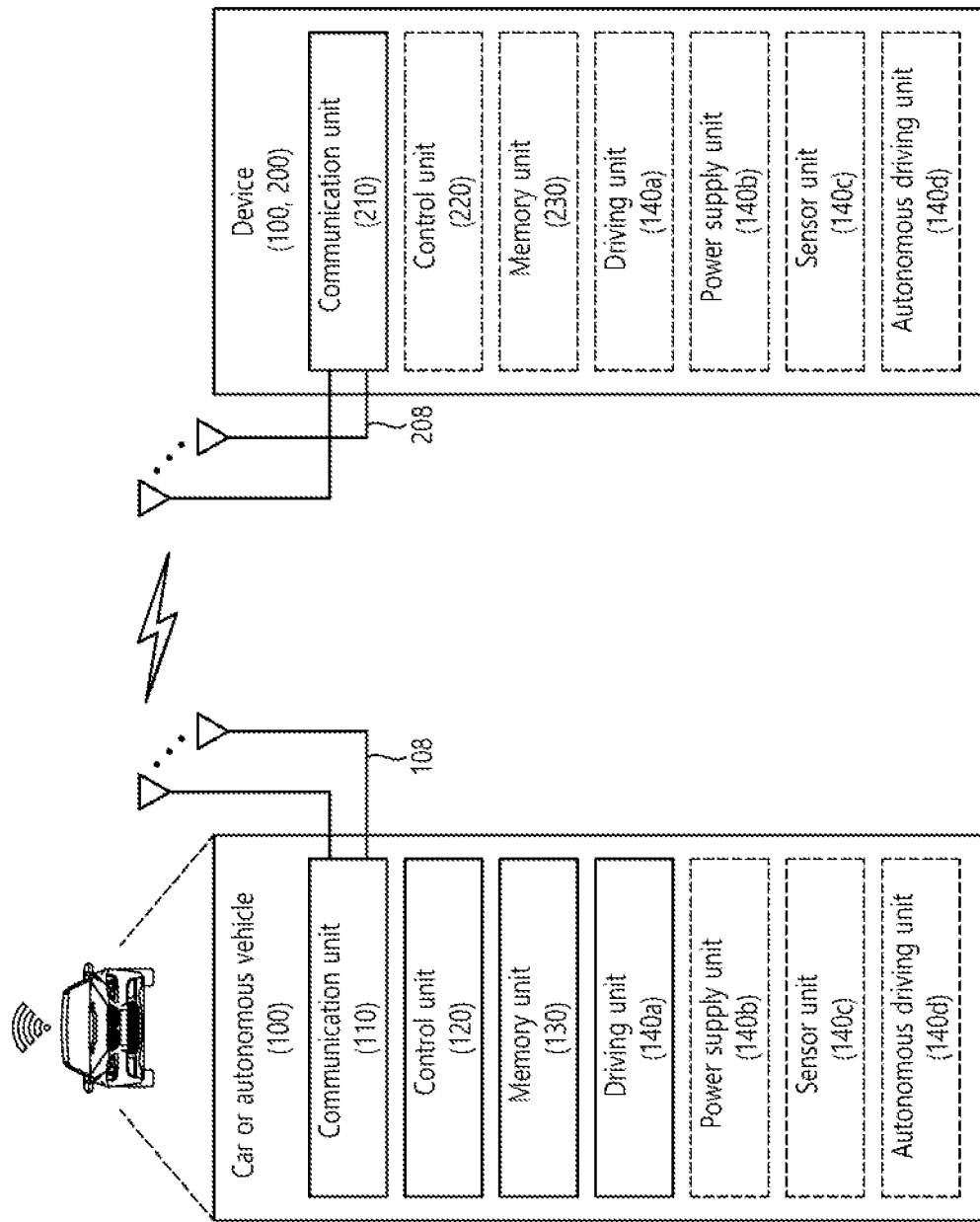
FIG. 21 shows a vehicle or an autonomous vehicle, based on an embodiment of the present disclosure.

FIG. 21 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 21, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:
generating uplink (UL) data;
determining that the UL data cannot be transmitted at a first time point, based on on/off switching of a sidelink (SL) radio frequency (RF) module, related to an SL discontinuous reception (DRX) configuration, performed at the first time point; and changing a time point at which on/off switching of the SL RF module is performed from the first time point to a second time point, based on the determination that the UL data cannot be transmitted at the first time point and a priority value related to the UL data is less than a threshold.

2. The method of claim 1, wherein the UL data is determined as cannot be transmitted at the first time point, based on interruption that occurs based on on/off switching of the SL RF module.

3. The method of claim 2, wherein the interruption occurs in a retransmission resource related to the UL data.

4. The method of claim 1, wherein the time point at which on/off switching of the SL RF module is performed is not changed to the second time point, based on the priority value related to the UL data being greater than the threshold.

5. The method of claim 4, further comprising:
dropping the UL data in a UL resource within the first time point, based on the time point at which on/off switching of the SL RF module is performed being not changed to the second time point.

6. The method of claim 1, further comprising:
transmitting, to a base station, a scheduling request (SR) for transmitting the UL data, based on the determination that the UL data cannot be transmitted at the first time point;
receiving, from the base station, a first UL grant for buffer status report (BSR) as a response to the SR; transmitting, to the base station, BSR based on the first UL grant;
receiving, from the base station, a second UL grant for the UL data; and
retransmitting, to the base station, the UL data based on the second UL grant.

7. The method of claim 1, further comprising:
determining that a hybrid automatic repeat request (HARQ) feedback cannot be received through a physical sidelink feedback channel (PSFCH) at a third time point, based on on/off switching of a Uu RF module related to a Uu DRX configuration, performed at the third time point; and
transmitting, to a base station, a HARQ negative acknowledge (NACK), based on the determination that the HARQ feedback cannot be received at the third time point.

8. The method of claim 1, further comprising:
determining that SL data cannot be transmitted to a second device at a third time point, based on on/off switching of a Uu RF module related to a Uu DRX configuration, performed at the third time point.

9. The method of claim 8, further comprising:
selecting an SL resource through resource reselection procedure, based on the determination that the SL data cannot be transmitted at the third time point; and
transmitting, to the second device, the SL data based on the SL resource,
wherein the SL resource is selected outside the third time point.

10. The method of claim 9, further comprising:
receiving, from the second device, a sidelink control information (SCI) report request,
wherein the SL data is an SCI report.

11. The method of claim 10, wherein the SL resource is selected within latency budget related to the SCI report.

12. The method of claim 11, further comprising:
dropping the SL data, based on the SL resource cannot being selected within the latency budget.

13. The method of claim 8, further comprising:
changing a time point at which on/off switching of the Uu RF module is performed from the third time point to a fourth time point, based on the determination that the SL data cannot be transmitted at the third time point and a priority value related to the SL data is less than a second threshold.

14. A first device for performing wireless communication, the first device comprising:
one or more memories storing instructions;
one or more transceivers; and one or more processors connected to the one or more memories and the one or more transceivers, wherein the one or more processors execute the instructions to:
generate uplink (UL) data;
determine that the UL data cannot be transmitted at a first time point, based on on/off switching of a sidelink (SL) radio frequency (RF) module, related to an SL discontinuous reception (DRX) configuration, performed at the first time point; and
change a time point at which on/off switching of the SL RF module is performed from the first time point to a second time point, based on the determination that the UL data cannot be transmitted at the first time point and a priority value related to the UL data is less than a threshold.

15. A device adapted to control a first user equipment (UE), the device comprising:
one or more processors; and
one or more memories operably connectable to the one or more processors and storing instructions, wherein the one or more processors execute the instructions to:
generate uplink (UL) data;
determine that the UL data cannot be transmitted at a first time point, based on on/off switching of a sidelink (SL) radio frequency (RF) module, related to an SL discontinuous reception (DRX) configuration, performed at the first time point; and
change a time point at which on/off switching of the SL RF module is performed from the first time point to a second time point, based on the determination that the UL data cannot be transmitted at the first time point and a priority value related to the UL data is less than a threshold.

* * * * *